US011574746B2

(12) United States Patent
Cheatham, III

(10) Patent No.: US 11,574,746 B2
(45) Date of Patent: Feb. 7, 2023

(54) FLUX-SHIFTING REACTIVITY CONTROL SYSTEM

(71) Applicant: TerraPower, LLC, Bellevue, WA (US)

(72) Inventor: Jesse R. Cheatham, III, Seattle, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 189 days.

(21) Appl. No.: 17/081,976

(22) Filed: Oct. 27, 2020

(65) Prior Publication Data

US 2021/0210223 A1    Jul. 8, 2021

Related U.S. Application Data

(62) Division of application No. 14/985,138, filed on Dec. 30, 2015, now abandoned.

(Continued)

(51) Int. Cl.
    *G21C 7/08*             (2006.01)
    *G21C 7/18*             (2006.01)
(Continued)

(52) U.S. Cl.
CPC .............. *G21C 7/12* (2013.01); *G21C 1/026* (2013.01); *G21C 7/08* (2013.01); *G21C 7/18* (2013.01); *G21D 3/08* (2013.01); *Y02E 30/30* (2013.01)

(58) Field of Classification Search
CPC .......... G21C 1/026; G21C 7/00; G21C 7/005; G21C 7/08; G21C 7/103; G21C 7/12; G21C 7/18
See application file for complete search history.

(56) References Cited

U.S. PATENT DOCUMENTS

| | | | |
|---|---|---|---|
| 2,856,336 | A | 10/1958 | Metcalf |
| 2,938,847 | A | 5/1960 | Yeomans |

(Continued)

FOREIGN PATENT DOCUMENTS

| | | | |
|---|---|---|---|
| GB | 998540 | A | 7/1965 |
| JP | 58124987 | A | 7/1983 |

(Continued)

OTHER PUBLICATIONS

Hejzlar et al., "Conceptual Neutronic Design of a Lead-Bismuth—Cooled Actinide Burning Reactor", Nuclear Science and Engineering, vol. 139, pp. 138-155, 2001.

(Continued)

*Primary Examiner* — Sharon M Davis
(74) *Attorney, Agent, or Firm* — FisherBroyles, LLP; Jeremy P. Sanders

(57) ABSTRACT

A control assembly for a nuclear reactor includes a first reactivity control assembly having a first neutron modifying material, a second reactivity control assembly having a second neutron modifying material, and at least one drive mechanism coupled to the first neutron modifying material and the second neutron modifying material. The first neutron modifying material and the second neutron modifying material are selectively repositionable relative to a fuel region of the nuclear reactor. The at least one drive mechanism is configured to provide the first neutron modifying material and the second neutron modifying material in different directions through the fuel region thereby shifting a flux distribution within the fuel region away from the second neutron modifying material.

19 Claims, 20 Drawing Sheets

Related U.S. Application Data

(60) Provisional application No. 62/098,963, filed on Dec. 31, 2014.

(51) Int. Cl.
*G21C 7/12* (2006.01)
*G21C 1/02* (2006.01)
*G21D 3/08* (2006.01)

(56) References Cited

U.S. PATENT DOCUMENTS

| | | |
|---|---|---|
| 3,263,004 A | 7/1966 | Bean |
| 3,784,677 A | 1/1974 | Versteeg et al. |
| 4,668,468 A | 5/1987 | Santucci |
| 5,852,645 A | 12/1998 | Romary et al. |
| 6,408,041 B2 | 6/2002 | Hirukawa |
| 8,942,338 B2 | 1/2015 | Ahlfeld et al. |
| 2001/0036242 A1 | 11/2001 | Hirukawa |
| 2010/0254501 A1 | 10/2010 | Ahlfeld et al. |
| 2010/0266085 A1 | 10/2010 | Ahlfeld et al. |

FOREIGN PATENT DOCUMENTS

| | | |
|---|---|---|
| JP | 2013510312 A | 8/2011 |
| KR | 20120104218 A | 9/2012 |
| RU | 2515501 C2 | 5/2014 |
| RU | 2527425 C2 | 8/2014 |
| WO | 2009148391 A1 | 12/2009 |
| WO | 2010129009 A2 | 11/2010 |
| WO | 2010147614 A1 | 12/2010 |
| WO | 2010147615 A1 | 12/2010 |
| WO | 2011056235 A1 | 5/2011 |
| WO | 2011093839 A2 | 8/2011 |
| WO | 2011093844 A2 | 8/2011 |

OTHER PUBLICATIONS

Pahl, R.G. et al., "Experimental studies of U—Pu—Zr fast reactor fuel pins in EBR-II", Argonne National Laboratory, ANL Report No. CONF-8809202-2 (1988).

FLUX-SHIFTING REACTIVITY CONTROL SYSTEM

CROSS-REFERENCES TO RELATED APPLICATIONS

This application is a divisional of U.S. patent application Ser. No. 14/985,138, filed Dec. 30, 2015, which application claims priority and benefit under 35 U.S.C. § 119 to U.S. application Ser. No. 62/098,963, entitled "Flux-Shifting Reactivity Control System," filed on Dec. 31, 2014, all of which are incorporated herein by reference in their entirety.

BACKGROUND

Light water nuclear fission reactors may employ flux shaping, which focuses on the production of poisons to control reactivity. By way of example, a short and long rod approach may be employed to axially shape flux to damp out Xenon oscillations within the core. By way of another example, shaping rods have been used to control power distributions, but such systems are not focused on breeding distributions.

BRIEF SUMMARY

Disclosed embodiments include control assemblies for nuclear reactors, nuclear reactors, reactor cores for nuclear reactors, methods for controlling nuclear reactors, and methods for manufacturing control assemblies for nuclear reactors.

The foregoing is a summary and thus may contain simplifications, generalizations, inclusions, and/or omissions of detail; consequently, those skilled in the art will appreciate that the summary is illustrative only and is NOT intended to be in any way limiting. In addition to any illustrative aspects, embodiments, and features described above, further aspects, embodiments, and features will become apparent by reference to the drawings and the following detailed description. Other aspects, features, and advantages of the devices and/or processes and/or other subject matter described herein will become apparent in the teachings set forth herein.

BRIEF DESCRIPTION OF THE SEVERAL VIEWS OF DRAWINGS

To easily identify the discussion of any particular element or act, the most significant digit or digits in a reference number refer to the figure number in which that element is first introduced.

DETAILED DESCRIPTION

Figure 1A:
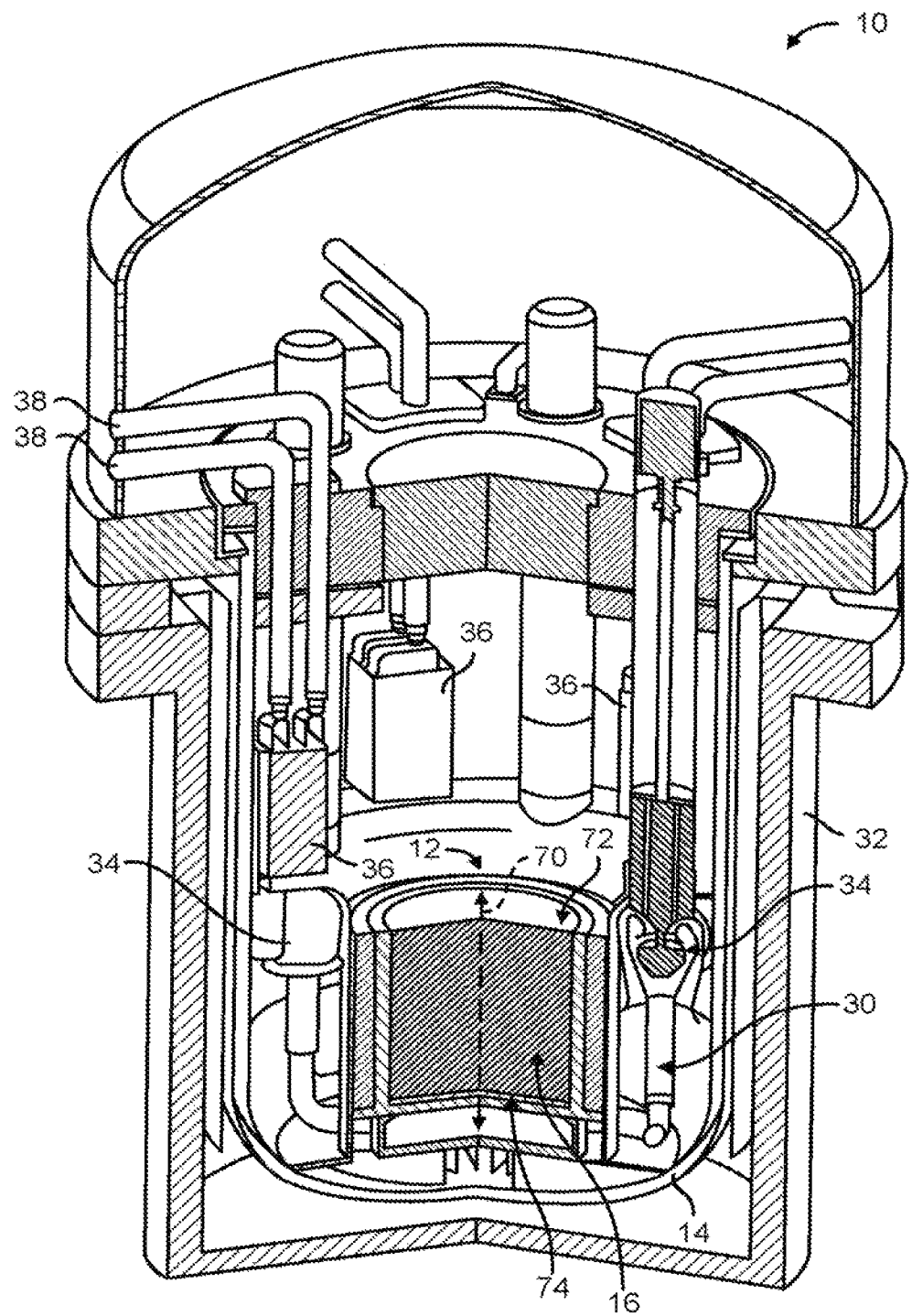
FIG. 1A is a partial-cutaway perspective view of a nuclear fission reactor, according to one embodiment.

Traveling Wave Reactors (TWRs) create a deflagration wave of burning fissionable fuel to breed up fertile fuel into fissile fuel through a deflagration wave, i.e., a breed-and-burn reactor. In the breed-and-burn reactor, fast spectrum neutrons produced by fission are absorbed by adjacent fertile material due to neutron capture, thereby breeding the fertile material into fissile material. The deflagration wave of breed and burn travels relative to the fuel, and if the fuel is shuffled or moved, then the wave may be maintained to be substantially stationary in 3D space relative to the nuclear plant but still move relative to the fuel (e.g., a standing wave). Both stationary wave and moving waves are incorporated into the definition of a travelling wave reactor.

By way of example in a TWR, the wave may be a boundary or an interface associated with the nuclear fission reactor core of the nuclear fission reactor. In one embodiment, the wave includes one or more regions along which breeding and burning (i.e., fissioning, etc.) occurs within the nuclear fission reactor core. In another embodiment, the wave includes one or more regions within the nuclear fission reactor core having relatively high flux levels; that is, one region of the fission reactor core has a relatively high number or rate of neutrons that split other fissile atoms and breed up fertile fuel into fissile fuel. The location of the wave is defined by the flux level and number of generated neutrons in that region as compared to other regions of the fission reactor core. The relatively high flux levels in one region of a fission reactor core may be measured relative to other regions within the nuclear fission reactor core. The control assembly may selectively reposition the one or more neutron modifying materials to control the position of the wave. In one embodiment, at least one drive mechanism of the control assembly is positioned or otherwise configured to selectively reposition (e.g., activate, engage, etc.) the one or more neutron modifying materials.

The nuclear fission reactor core may include fissile nuclear fuel assemblies (i.e., a set of starter fuel assemblies, etc.) and fertile nuclear fuel assemblies (i.e., a set of feed fuel assemblies, etc.), and/or fuel assemblies that include fissile and fertile fuel. The nuclear fission reactor may thereby be a high breeding rate reactor. By way of example, the nuclear fission reactor may be a breed-and-burn nuclear fission reactor. Fissile nuclear fuel material in the fissile nuclear fuel assemblies is fissioned in the nuclear fission reactor core. Fissile material is bred in the fertile nuclear fuel assemblies in the nuclear fission reactor core. The wave at which breeding and burning occurs may be disposed along the fissile nuclear fuel assemblies. The wave at which breeding and burning occurs may be also disposed along the fertile nuclear fuel assemblies.

In one embodiment, the nuclear fission reactor core includes a handling system. The handling system may include an in-vessel handling system. The handling system may be configured to selectively reposition fissile nuclear fuel assemblies in the fuel region. In other embodiments, the handling system is configured to selectively reposition certain fertile nuclear fuel assemblies. The handling system may be configured to provide at least one of certain fissile nuclear fuel assemblies and certain fertile nuclear fuel assemblies in a manner that establishes a wave that is substantially stationary within the nuclear fission reactor core. By way of example, a wave that is substantially stationary may define a standing wave of breeding fissile nuclear fuel material and fissioning fissile nuclear fuel material.

Figure 9A:
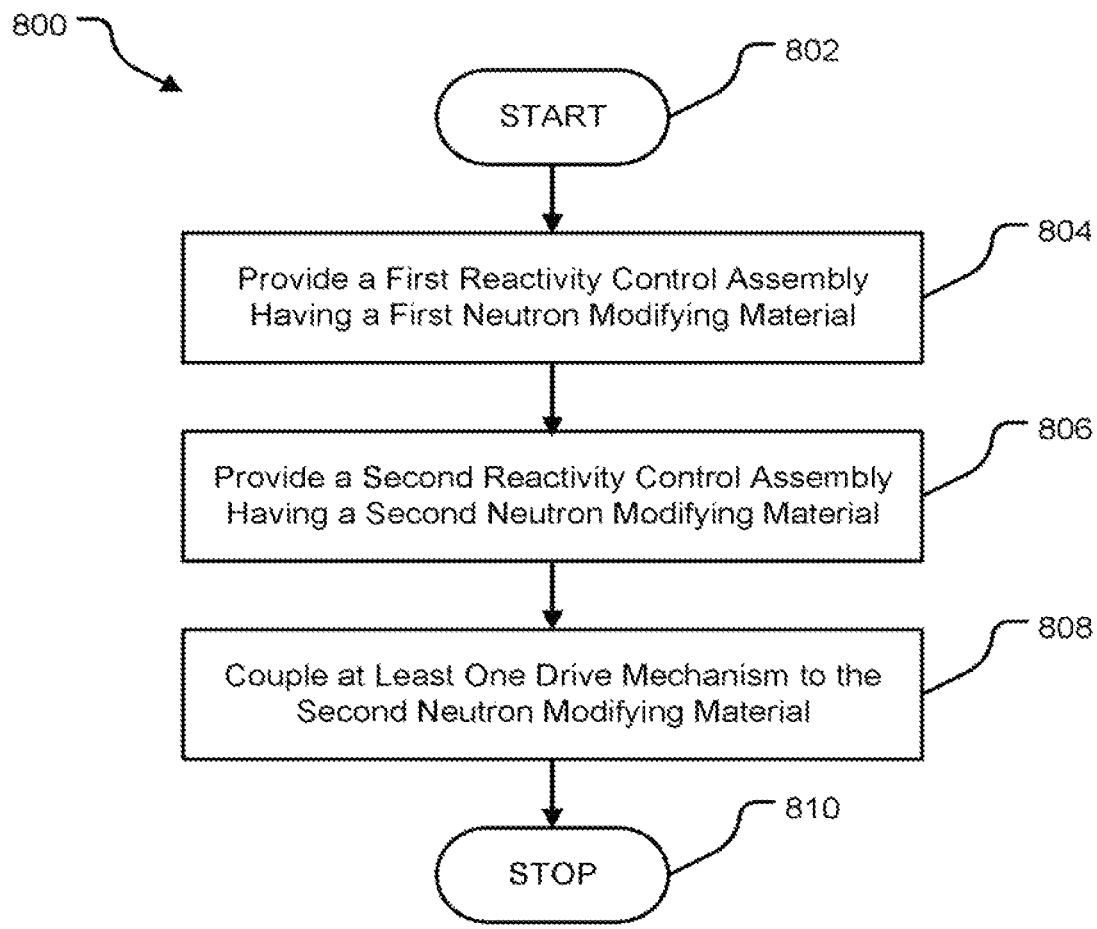
FIG. 9A is a schematic diagram of a method of manufacturing a control assembly for a nuclear reactor, according to one embodiment.
Figure 9B:
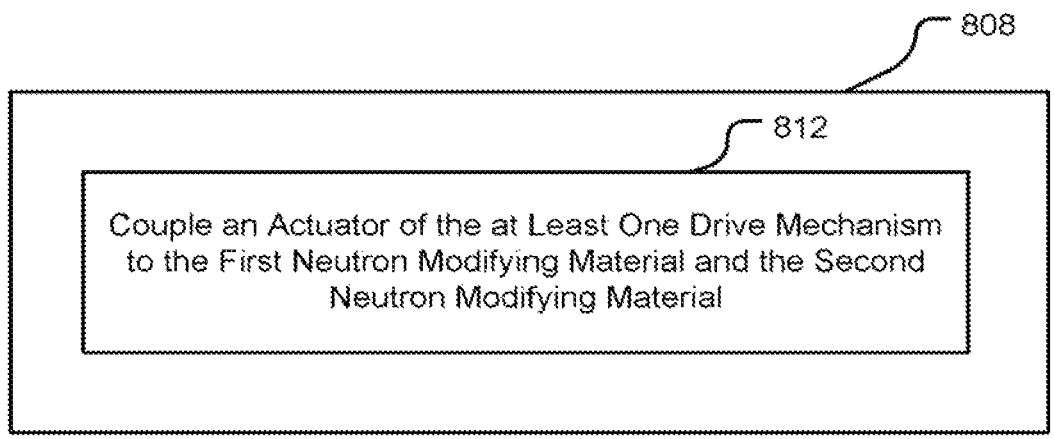
FIG. 9B is a schematic diagram of a method of controlling a nuclear reactor, according to one embodiment.
Figure 9C:
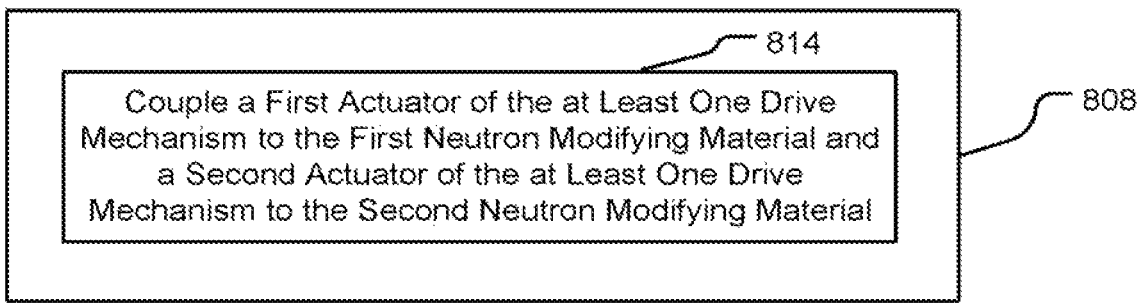
FIG. 9C is a schematic diagram of a method of controlling a nuclear reactor, according to one embodiment.
Figure 9D:
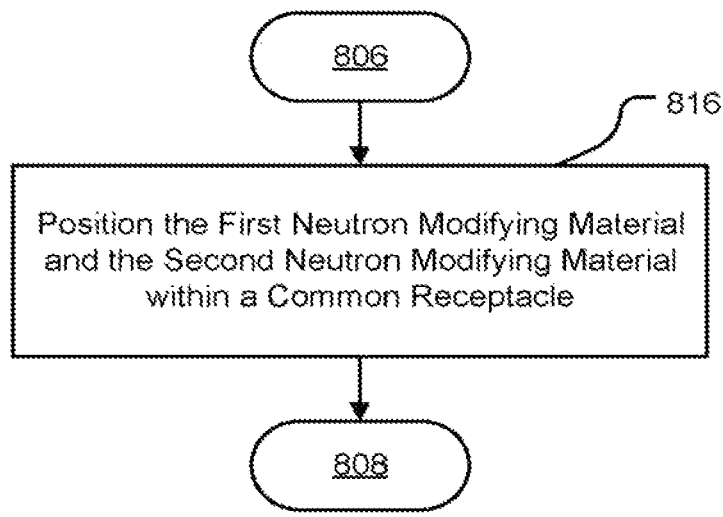
FIG. 9D is a schematic diagram of a method of controlling a nuclear reactor, according to one embodiment.
Figure 9E:
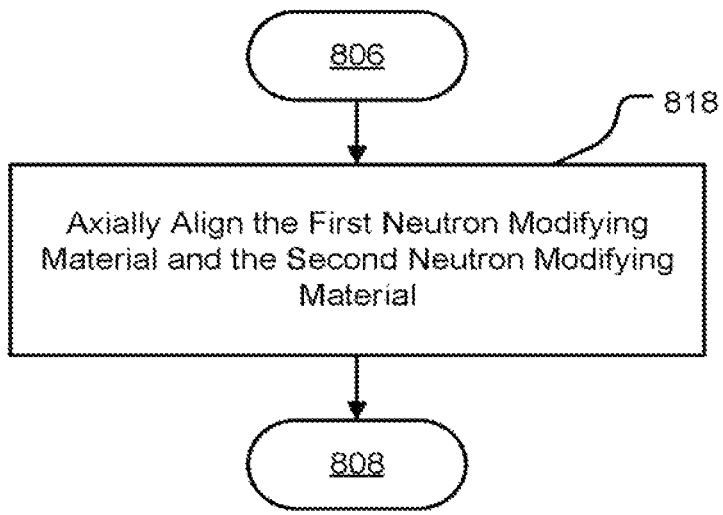
FIG. 9E is a schematic diagram of a method of controlling a nuclear reactor, according to one embodiment.
Figure 9F:
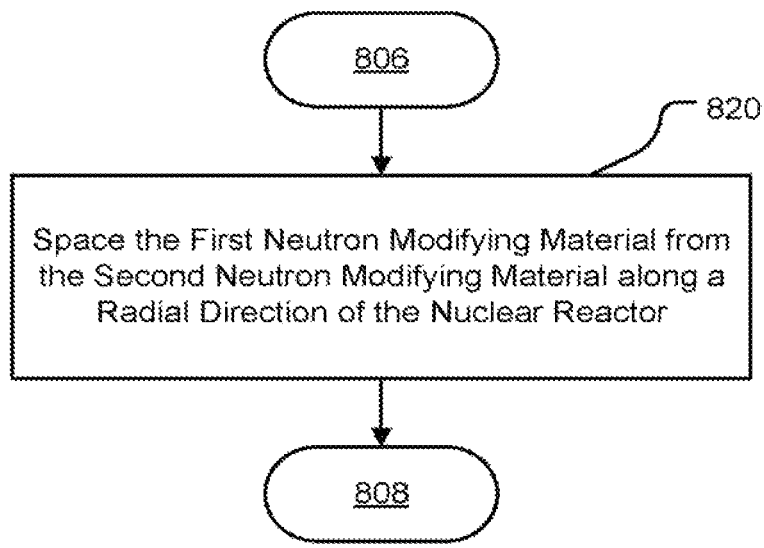
FIG. 9F is a schematic diagram of a method of controlling a nuclear reactor, according to one embodiment.
Figure 9G:
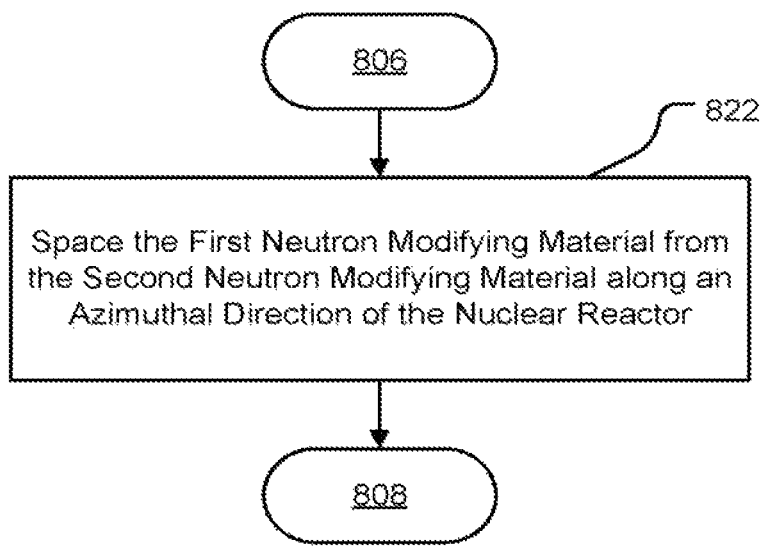
FIG. 9G is a schematic diagram of a method of controlling a nuclear reactor, according to one embodiment.
Figure 10:
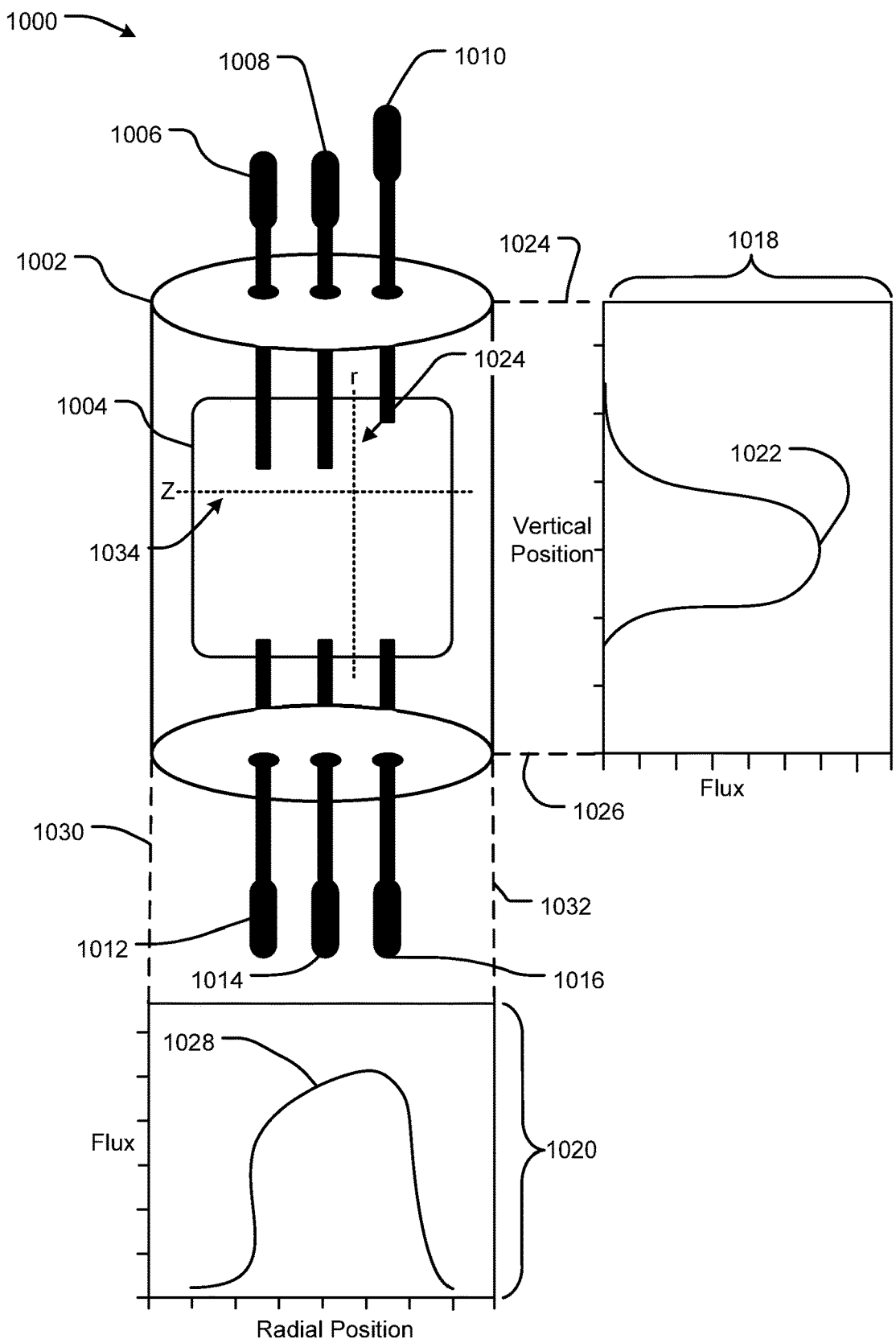
FIG. 10 is a schematic diagram of reactor core for a nuclear fission reactor including control assemblies and neutron flux profiles, according to one embodiment.
Figure 11:
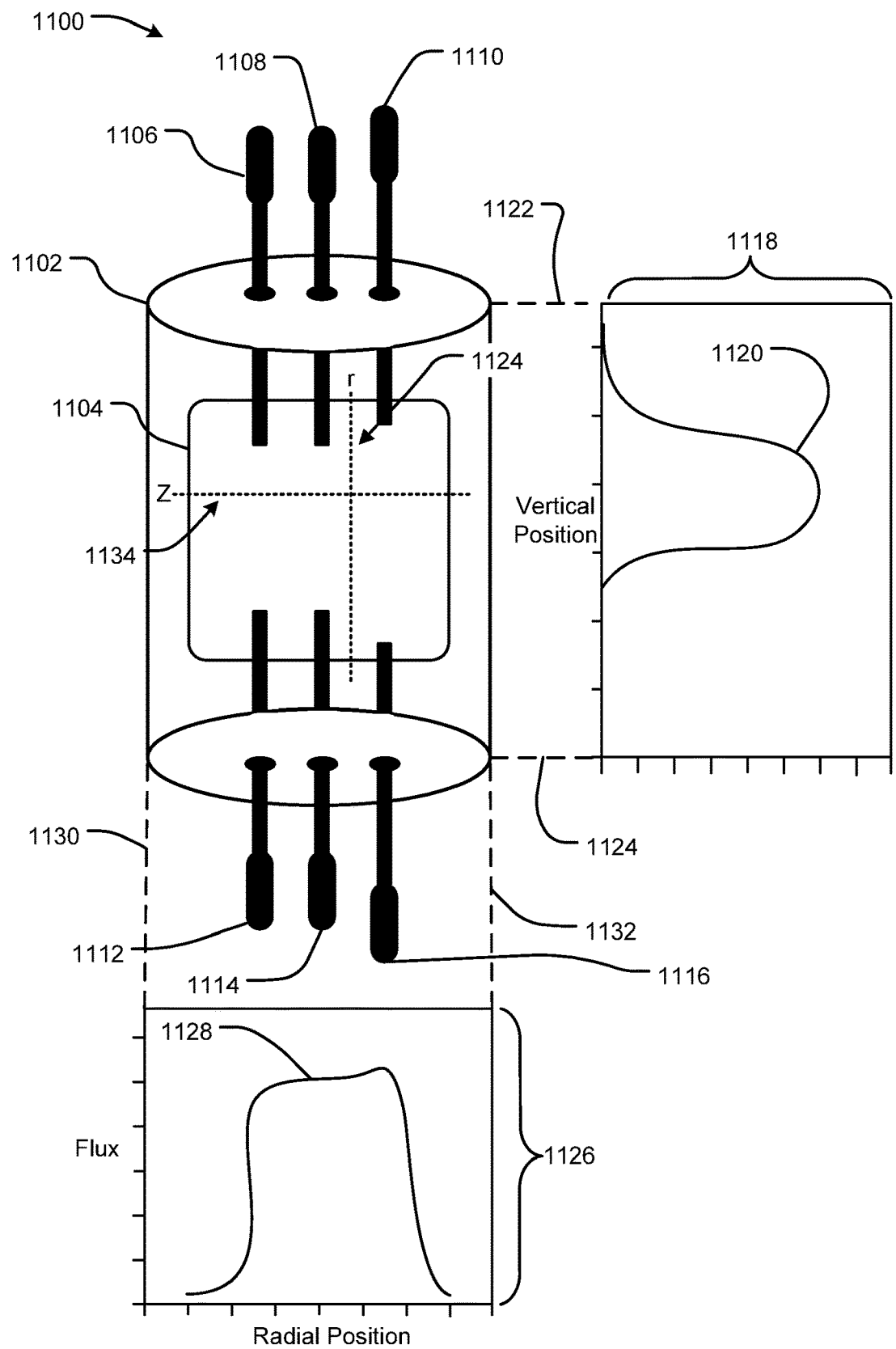
FIG. 11 is a schematic diagram of reactor core for a nuclear fission reactor including control assemblies and neutron flux profiles, according to one embodiment.
Figure 12:
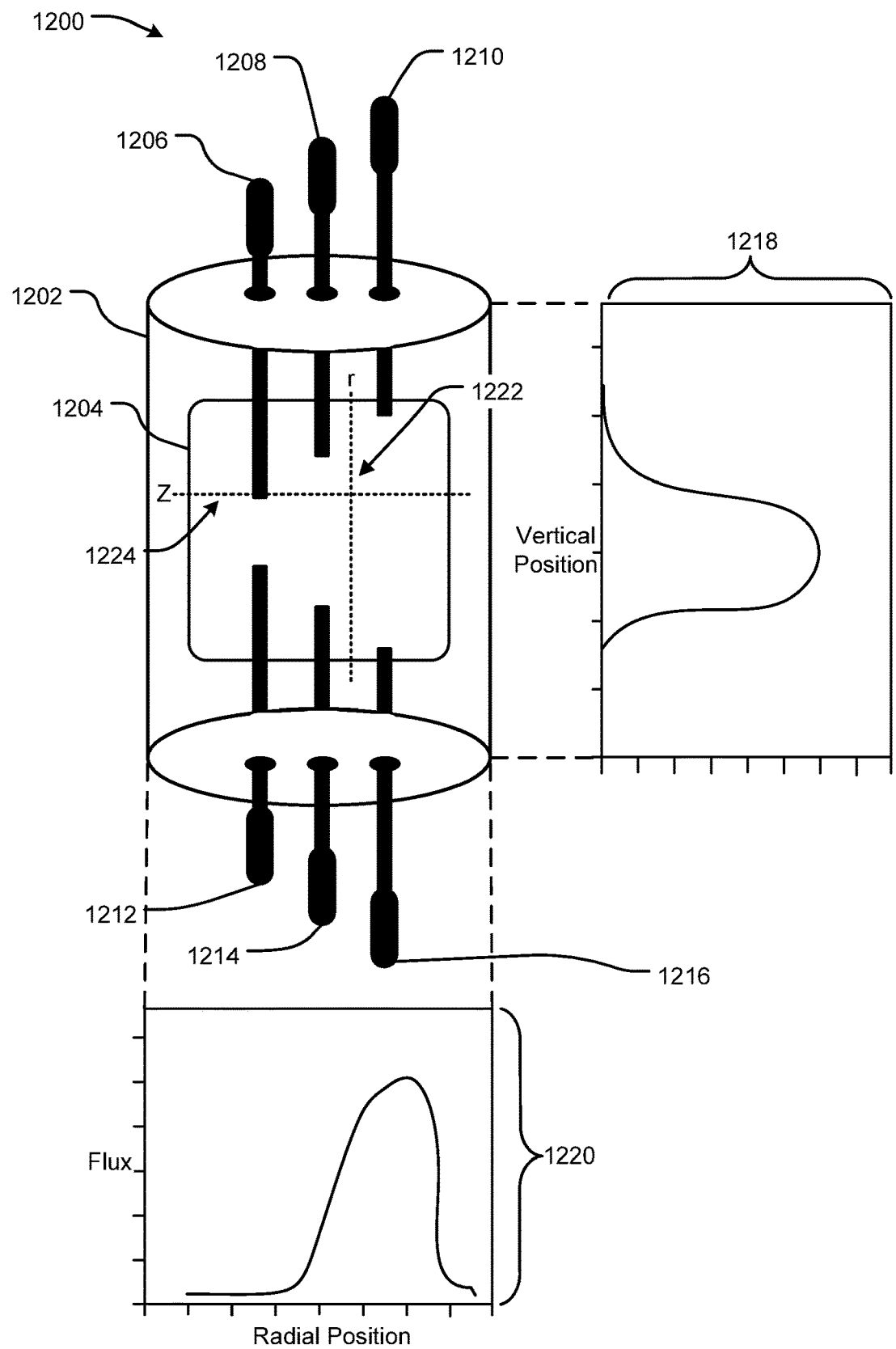
FIG. 12 is a schematic diagram of reactor core for a nuclear fission reactor including control assemblies and neutron flux profiles, according to one embodiment.

A description of FIGS. 10-12 is provided before FIGS. 1-9 in order to provide an introduction and context to the disclosure contained herein. The subsequent description of FIGS. 1-9 provides additional details of the present implementations. FIG. 10 illustrates a nuclear reactor 1000 with nuclear reactor core 1002 and fuel region 1004 disposed therein. Fuel region 1004 may contain fissionable and/or fertile nuclear material. The nuclear fission chain reaction may be controlled according to the selective insertion of a plurality of control assemblies that may contain neutron modifying materials as described herein. The neutron modifying materials may include one or more types of fuel and/or one or more types of neutron absorbers. The control assemblies may sustain the nuclear chain reaction in fuel region 1004 for an arbitrary length of time, such as over a period of years or indefinitely, depending on the configuration of the control assemblies. In an implementation, first moveable control assemblies 1006, 1008, 1010 are moveably disposed above fuel region 1004, and may slidably extend downward into the fuel region in a "top-down" configuration. In this implementation, second moveable control assemblies 1012, 1014, and 1016 are moveably disposed below fuel region 1004, and may slidably extend upward into the fuel region 1004 in a "bottom-up" configuration. It should be understood that other control assembly configurations are also disclosed, including one or more control assemblies disposed in a radial, lateral, or other direction, and selectively moveable into fuel region 1004.

The position of the first (1006, 1008, 1010) and second (1012, 1014, 1016) moveable control assemblies modifies the neutron flux in fuel region 1004. By selecting the position of the first and second moveable control assemblies, an instantaneous neutron flux or a total neutron flux over a period of time (i.e., time-integrated neutron flux over an arbitrary period of time) may be selected for a portion of fuel region 1004. In an implementation, a target neutron flux may be identified and compared to a current neutron flux according to a sensing means. The sensing means may be direct, such as through a neutron flux sensor, or it may be indirect, such as through a temperature sensor or a flux model for modelling neutron flux in fuel region 1004 based on historical positioning of the control assemblies.

For any configuration of the first and second control assemblies, a neutron flux profile may be expressed to describe the corresponding neutron flux present in fuel region 1004. Neutron flux profile plots 1018 and 1020 are shown in FIG. 10. Neutron flux profile plots 1018 and 1020 show neutron flux magnitude as a function of vertical position and radial position in fuel region 1004, respectively. Neutron flux profile plot 1018 indicates flux magnitude 1022 on the horizontal x-axis against vertical position in fuel region 1004 on the vertical y-axis. Neutron flux profile plot 1018 has been positioned adjacent to the illustration of fuel region 1004 and nuclear reactor core 1002 such that the vertical position shown on the plot corresponds to the same vertical position in the fuel region. For example, top line 1024 indicates a vertical position at or near the top of reactor core 1002, and above fuel region 1004. The magnitude 1022 of neutron flux at this point is shown at or near zero. On the other end of neutron flux plot 1018, a bottom line 1026 indicates a vertical position at or near the bottom of reactor core 1002, and below fuel region 1004. The magnitude of neutron flux 1022 at bottom line 1026 is also at or near zero on neutron flux profile plot 1018.

It should be understood that neutron flux profile plots 1018, 1020 are illustrated according to fixed radial position and vertical position variables, respectively. In other words, a neutron flux profile describes the neutron flux in a cross-sectional plane of fuel region 1004. The cross-sectional plane may be a vertical plane at a fixed radial position as in neutron flux plot 1018, the cross-sectional plane may be a horizontal plane at a fixed vertical position as in neutron flux plot 1020, or the cross-sectional plane may be any other plane intersecting fuel region 1004. On neutron flux plot 1018, a chosen radial distance r is indicated by line 1024. Neutron flux magnitude 1022 is therefore shown according to vertical position along line 1024. Choosing a different radial position r would alter flux magnitude 1022 according to the relative position of first control assemblies 1006, 1008, 1010 and second control assemblies 1012, 1014, and 1016.

Neutron flux profile plot 1020 describes neutron flux magnitude 1028, shown on the vertical y-axis, according to radial position shown on the horizontal x-axis. Neutron flux profile plot 1020 is disposed below nuclear reactor core 1002 in FIG. 10 such that the radial position shown on the plot corresponds to the same radial position in the fuel region 1004. Accordingly, left-side line 1030 corresponds to a left-most radial position of nuclear reactor core 1002, and right-side line 1032 corresponds to a right-most radial position of nuclear reactor core 1002. Plot 1020 shows a neutron flux profile, which, as discussed above, is a plot of neutron flux along a plane intersecting fuel region 1004. Plot 1020 indicates neutron flux as a function of radial position, and therefore corresponds to a fixed vertical position Z shown by line 1034. In other words, plot 1020 shows the neutron flux 1028 of a horizontal plane intersecting fuel region 1004 at vertical position Z shown by line 1034.

FIG. 11 illustrates a nuclear reactor 1100 including nuclear reactor core 1102 and fuel region 1104 disposed therein. In an implementation, first moveable control assemblies 1106, 1108, 1110 are moveably disposed above fuel region 1104, and may slidably extend downward into the fuel region in a "top-down" configuration. In this implementation, second moveable control assemblies 1112, 1114, and 1116 are moveably disposed below fuel region 1004, and may slidably extend upward into the fuel region 1104 in a "bottom-up" configuration. It should be understood that other control assembly configurations are also disclosed, including one or more control assemblies disposed in a radial, lateral, or other direction, and selectively moveable into fuel region 1004. The position of moveable first control assemblies (1106, 1108, 1110) and second moveable control assemblies (1112, 1114, 1116) are disposed in a different configuration than the configuration illustrated in FIG. 10. In FIG. 11, two of the first moveable control assemblies 1106, 1108 and two of the second moveable control assemblies 1112, 1114 are translated upward, each by an equal axial distance. The configuration of control assemblies shown in FIG. 11 is therefore of the same absolute worth as the configuration of control assemblies shown in FIG. 10, but the resulting neutron flux in fuel region 1104 is translated upward. The upward translation of neutron flux in FIG. 11 relative to FIG. 10 is illustrated in neutron flux profile plot 1118, which plots neutron flux 1120 as a function of vertical position within nuclear reactor core 1102. Neutron flux profile plot 1118 is positioned adjacent to nuclear reactor core 1102 such that the vertical position shown in plot 1118 corresponds to the same vertical position of nuclear reactor core 1102. Top-line 1122 and bottom-line 1124 indicate the high and low vertical positions, respectively, of the plot and nuclear reactor core 1102. Due to the relative movement of first moveable control assemblies 1106, 1108 and second moveable control assemblies 1112, 1114 in FIG. 11 compared to the configuration shown in FIG. 10, neutron flux magnitude 1120 is shifted upward to a higher vertical position on plot 1118 compared to plot 1018 in FIG. 10. This upward shift indicates an upward movement of the neutron flux in fuel region 1104 in a vertical plane defined by the chosen radial distance r indicated by line 1124.

Neutron flux profile plot 1126 in FIG. 11 illustrates neutron flux 1128 as a function of radial position in fuel region 1104. Plot 1126 is located below nuclear reactor core 1102 to indicate that radial position on plot 1126 corresponds to the same radial position on nuclear reactor core 1102 as indicated by left-line 1130 and right-line 1132. Since plot 1126 is a neutron flux profile plot, it shows flux 1128 along a horizontal plane intersecting fuel region 1104 at a chosen vertical position Z shown by line 1134.

FIG. 12 illustrates nuclear reactor 1200 including nuclear reactor core 1202 and fuel region 1204. First movable control assemblies 1206, 1208, 1210, and second movable control assemblies 1212, 1214, and 1216 are in an echelon configuration to modify neutron flux in fuel region 1204 in a rightward direction. Neutron flux profile plots for the configuration of FIG. 12 are shown as functions of vertical position and radial position in plots 1218 and 1220, respectively. Neutron flux profile 1218 is depicted based on fixed radial position identified by line 1222, and neutron flux profile 1220 is depicted based on fixed vertical position identified by line 1224.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Given by way of overview, illustrative embodiments include: nuclear control assemblies; nuclear fission reactor cores; nuclear fission reactors; methods of controlling a nuclear fission reactor; and methods of manufacturing a control assembly for a nuclear fission reactor.

Embodiments of the control assembly selectively reposition a first neutron modifying material in a first direction. Selectively repositioning the first neutron modifying material may produce a change (e.g., variation, movement, etc.) in the wave. The control assembly selectively repositions the second neutron modifying material in a second direction. Selectively repositioning the second neutron modifying material may counteract the change in the wave associated with repositioning the first neutron modifying material. By way of example, the first neutron modifying material and the second neutron modifying materials may be selectively repositioned toward substantially opposing sides of the wave. In other embodiments, the first neutron modifying material and the second neutron modifying materials are selectively repositioned to otherwise control the wave.

By way of example, the neutron modifying materials may include a poison or another material that absorbs neutrons. By way of another example, the neutron modifying materials may include water or another material that reduces the speed of neutrons. In one embodiment, the first neutron modifying material and the second neutron modifying material have the same composition. In another embodiment, the first neutron modifying material and the second neutron modifying material have different compositions.

Embodiments of a control assembly selectively reposition one or more neutron modifying materials to control a nuclear fission reactor core of a nuclear fission reactor. Although the below description of the control assembly is provided with reference to an example breed and burn reactor (Travelling Wave Reactor), it is to be appreciated that the below example control assemblies may be used in any type of reactor including, without limitation, light water reactors, heavy water reactors, fission reactors, breeder reactors, fast reactors, breed and burn reactors, and may be used to control one or more aspects of the nuclear core including without limitation, reactivity, temperature, flux, flux over time, burn-up, burn-up rate, and any other characteristic of a nuclear reactor core.

Selectively repositioning the first neutron modifying material may include a movement relative to a fuel region of the nuclear fission reactor core. Selectively repositioning the first neutron modifying material may include a movement relative to a second neutron modifying material. Selectively repositioning the first neutron modifying material may include a movement toward or away from the wave. Selectively repositioning the second neutron modifying material may include a movement relative to the fuel region of the nuclear fission reactor core. Selectively repositioning the second neutron modifying material may include a movement relative to the first neutron modifying material. Selectively repositioning the second neutron modifying material may include a movement toward or away from the wave.

In one embodiment, the control assembly controls the wave to correct for axial asymmetries in the flux of the breed-and-burn nuclear fission reactor. Correcting for axial asymmetries in the flux may dramatically reduce peak burn-up in one or more fuel assemblies. Peak burn-up may be the percentage or other measure of fission that occurs in fissile fuel whereby a burn-up of 5% may indicate that 5% of the fuel underwent a fission reaction. Burn-up may be related to a power output. A power output may be related to a combination of flux and material properties. A flux distribution is thereby related to a power distribution by way of a given set of material properties.

Embodiments of this control assembly have multiple reactivity control assemblies that cooperate to control the breeding distribution. By way of example, the reactivity control assemblies may cooperate to control the breeding distribution within a fuel assembly or within the reactor core, among other alternatives. Control of the breeding distribution due to cooperation of the multiple reactivity control assemblies at least one of reduces (e.g., lessens, minimizes, eliminates, etc.) substantial undesired shifts in the power locations within the reactor core, reduces substantial undesired variations in the dose requirements of the reactor core, and reduces peak burn-ups.

In some cases, the first and second neutron modifying material may travel in the same and/or different (or even multiple) directions or axes relative to the core, the fuel, or even the axial direction of the fuel assemblies of the core.

In one embodiment in driver movement of the first and/or second neutron modifying materials relative to the core, the neutron modifying materials may travel along the length of the nuclear fission reactor core. In other embodiments, at least one of the neutron modifying materials travels laterally across the length of the nuclear fission reactor core. In still other embodiments, at least one of the neutron modifying materials travels along a radial direction of the nuclear fission reactor core. In yet other embodiments, at least one of the neutron modifying materials travels along an azimuthal direction of the nuclear fission reactor core.

In some embodiments, the multiple reactivity control assemblies include a "top-down" neutron modifying material and a "bottom-up" neutron modifying material. The top-down neutron modifying material (first neutron modifying material) may travel in the nuclear fission reactor core from the top thereof, and may extend through any portion of the reactor core, including without limitation travel through a distal end of the core, such that only a portion of the neutron modifying material is disposed within the core. The bottom-up neutron modifying material (second neutron modifying material) may travel in the nuclear fission reactor core from the bottom thereof, and may extend through any portion of the reactor core, including without limitation travel through a distal end of the core, such that only a portion of the neutron modifying material is disposed within the core. Although this and following descriptions may refer to "top-down'" and/or "bottom-up," this is in reference only to the orientation shown in many figures. It is to be appreciated that any appropriate orientation may be used, including radial orientation(s), or combination of radial orientation(s), "top-down," and/or "bottom-up" orientations.

In other embodiments, the multiple reactivity control assemblies include a first side neutron modifying material and a second side neutron modifying material. The first side neutron modifying material may travel in the nuclear fission reactor core from a first side thereof. The second side neutron modifying material may travel in the nuclear fission reactor core from a second side thereof. By way of example, a control assembly having such a combination of neutron modifying materials may control a lateral nuclear fission reactor.

In further embodiments, the multiple reactivity control assemblies include at least one neutron modifying material that travels in the nuclear fission reactor core laterally across a longitudinal direction thereof. The multiple reactivity control assemblies may also include a top-down neutron modifying material. The top-down neutron modifying material may travel along an axis that is substantially orthogonal to a plane within which the lateral neutron modifying material travels, and may extend through any portion of the reactor core, including without limitation travel through a distal end of the core, such that only a portion of the neutron modifying material is disposed within the core. In other embodiments, the multiple reactivity control assemblies also include a bottom-up neutron modifying material. The bottom-up neutron modifying material may travel along an axis that is substantially orthogonal to a plane within which the lateral neutron modifying material travels, and may extend through any portion of the reactor core, including without limitation travel through a distal end of the core, such that only a portion of the neutron modifying material is disposed within the core. In still other embodiments, the multiple reactivity control assemblies also include a second neutron modifying material that travels through the nuclear fission reactor core laterally across the longitudinal direction thereof. In yet other embodiments, the multiple reactivity control assemblies also include a second neutron modifying material that still otherwise moves through the nuclear fission reactor core.

In still other embodiments, the multiple reactivity control assemblies include at least one neutron modifying material that travels in the nuclear fission reactor core along a radial direction thereof. The multiple reactivity control assemblies may also include a top-down neutron modifying material that may extend through any portion of the reactor core, including without limitation travel through a distal end of the core, such that only a portion of the neutron modifying material is disposed within the core. The top-down neutron modifying material may travel along an axis that is substantially orthogonal to a plane within which the radial neutron modifying material travels. In other embodiments, the multiple reactivity control assemblies also include a bottom-up neutron modifying material. The bottom-up neutron modifying material may travel along an axis that is substantially orthogonal to a plane within which the radial neutron modifying material travels, and may extend through any portion of the reactor core, including without limitation travel through a distal end of the core, such that only a portion of the neutron modifying material is disposed within the core. In still other embodiments, the multiple reactivity control assemblies also include a second neutron modifying material that travels in the nuclear fission reactor core along a radial direction thereof. In yet other embodiments, the multiple reactivity control assemblies also include a second neutron modifying material that still otherwise moves in the nuclear fission reactor core.

In yet other embodiments, the multiple reactivity control assemblies include at least one neutron modifying material that travels in the nuclear fission reactor core along an azimuthal direction thereof. The multiple reactivity control assemblies may also include a top-down neutron modifying material that may extend through any portion of the reactor core, including without limitation travel through a distal end of the core, such that only a portion of the neutron modifying material is disposed within the core. In other embodiments, the multiple reactivity control assemblies also include a bottom-up neutron modifying material that may extend through any portion of the reactor core, including without limitation travel through a distal end of the core, such that only a portion of the neutron modifying material is disposed within the core. In still other embodiments, the multiple reactivity control assemblies also include a second neutron modifying material that travels in the nuclear fission reactor core along an azimuthal direction thereof. In yet other embodiments, the multiple reactivity control assemblies also include a second neutron modifying material that still otherwise moves in the nuclear fission reactor core.

In other embodiments, the multiple reactivity control assemblies include at least one neutron modifying material that travels in the nuclear fission reactor core at an angle relative to a longitudinal direction thereof. The multiple reactivity control assemblies may also include a top-down neutron modifying material that may extend through any portion of the reactor core, including without limitation travel through a distal end of the core, such that only a portion of the neutron modifying material is disposed within the core. In other embodiments, the multiple reactivity control assemblies also include a bottom-up neutron modifying material that may extend through any portion of the reactor core, including without limitation travel through a distal end of the core, such that only a portion of the neutron modifying material is disposed within the core. In still other embodiments, the multiple reactivity control assemblies also include a second neutron modifying material that travels in the nuclear fission reactor core at an angle relative to a longitudinal direction thereof. In yet other embodiments, the multiple reactivity control assemblies also include a second neutron modifying material that still otherwise moves through the nuclear fission reactor core.

In still other embodiments, the multiple reactivity control assembly includes at least one neutron modifying material that remains stationary during at least a portion of a power cycle. The control assembly may include a drive mechanism. In one embodiment, the drive mechanism is configured to selectively reposition the fuel of the nuclear reactor core relative to the at least one neutron modifying material. The drive mechanism may be configured to translate the fuel in a direction aligned along a length of the first or second neutron modifying material. In alternative or additional embodiments, the drive mechanism is configured to otherwise move the fuel relative to the neutron modifying material. In still other embodiments, the drive mechanism is configured to selectively reposition both the fuel and at least one of the neutron modifying materials (e.g., both the fuel and the neutron modifying material may be moved, etc.).

The control assembly may operate to control the location of the flux along the axial direction of the nuclear fission reactor core. In additional and alternative embodiments, the reactivity control assemblies operate to shift the flux distribution within the nuclear fission reactor core. The multiple control assemblies may be positioned to reduce the risk of radial power disturbances during the reactor cycle. In other embodiments, the multiple control assemblies are positioned to shift the flux distribution within the nuclear fission reactor core toward a target distribution profile. The use of the control assembly may substantially eliminate undesired wave movement (e.g., wave shifting, wave snuffing, etc.).

Figure 1B:
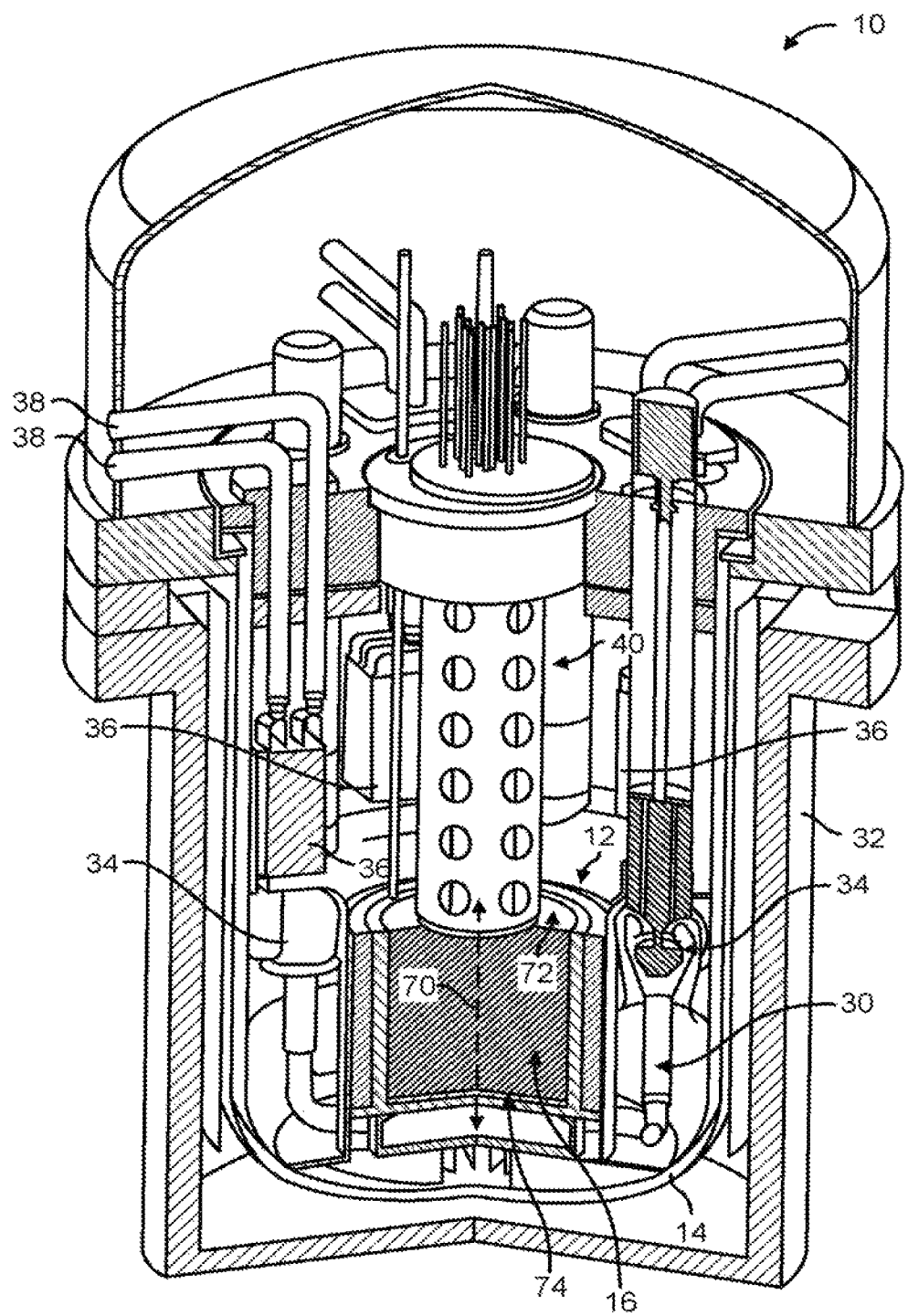
FIG. 1B is a partial-cutaway perspective view of a nuclear fission reactor, according to one embodiment.
Figure 1C:
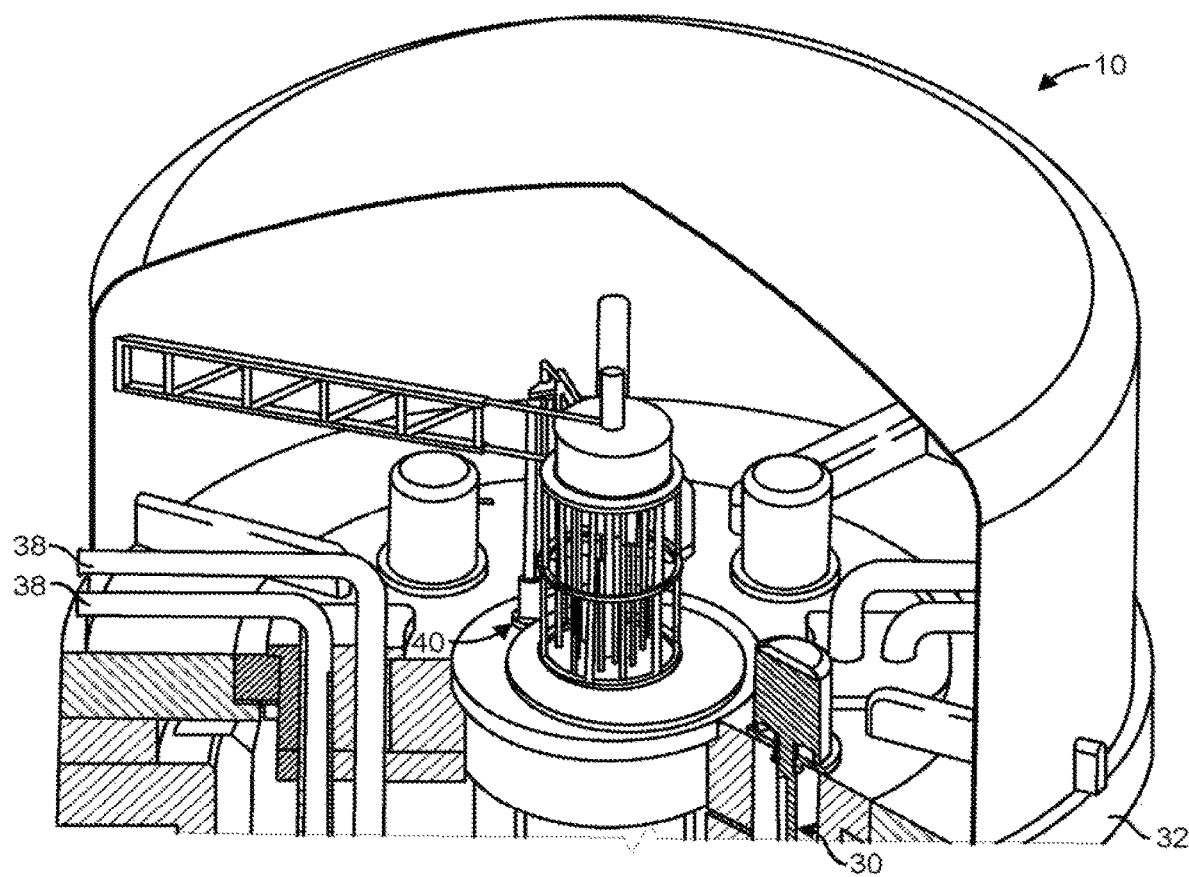
FIG. 1C is a partial-cutaways perspective view of a nuclear fission reactor, according to one embodiment.
Figure 2:
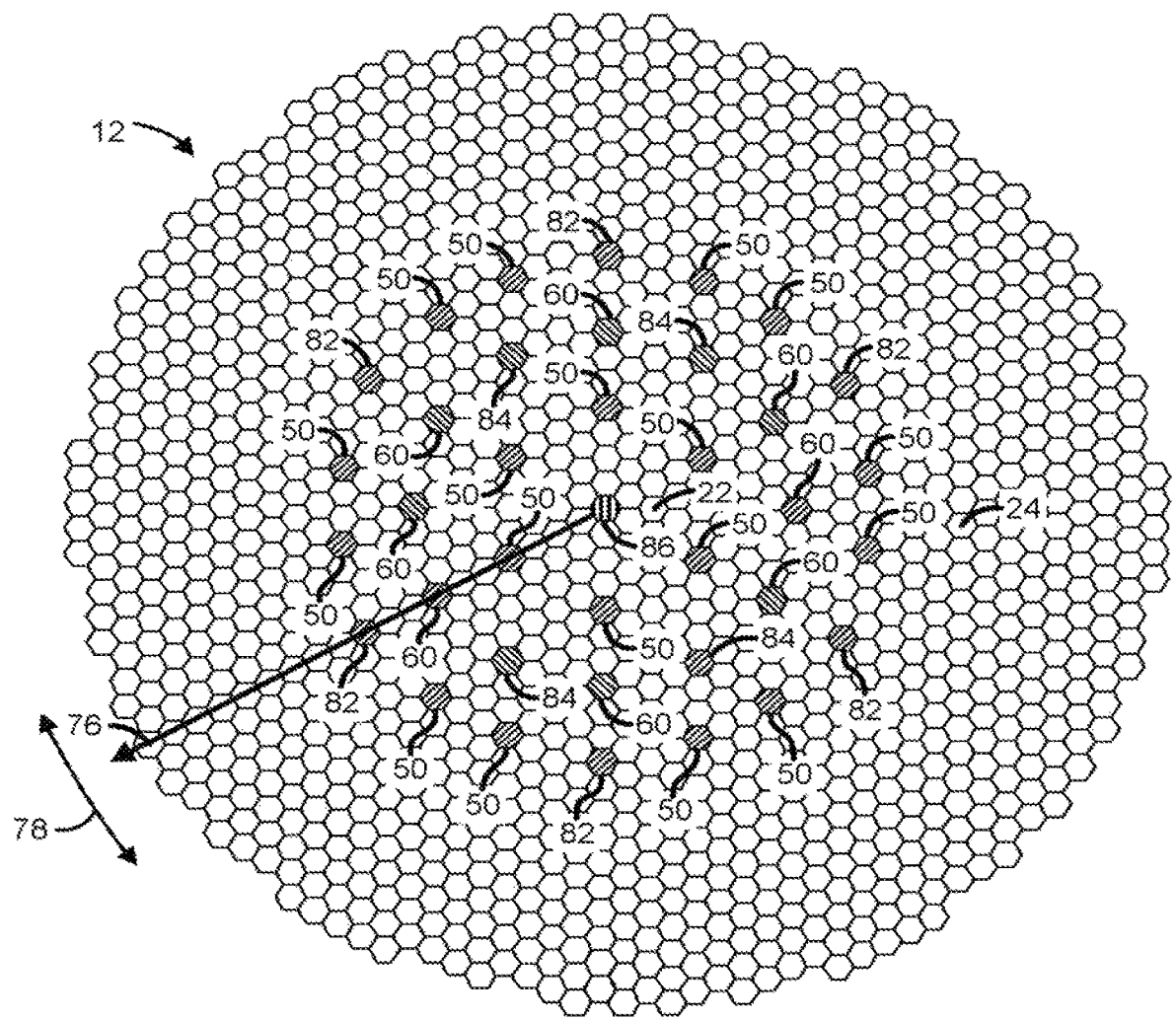
FIG. 2 is a top sectional view of a reactor core for a nuclear fission reactor, according to one embodiment.

Referring to FIGS. 1A-1C and FIG. 2 and given by way of non-limiting overview, an illustrative nuclear fission reactor 10 will be described by way of illustration and not of limitation. As shown in FIGS. 1A-1B, nuclear fission reactor 10 includes a nuclear fission reactor core 12 disposed in a reactor vessel 14. According to one embodiment, nuclear fission reactor core 12 includes a plurality of nuclear fuel assemblies having a plurality of ducts configured to contain nuclear fuel within a fuel region 16. The plurality of nuclear fuel assemblies may be disposed within reactor vessel 14. As shown in FIG. 2, nuclear fission reactor core 12 includes fissile nuclear fuel assemblies 22 (e.g., a set of starter fuel assemblies, etc.), and fertile nuclear fuel assemblies 24 (e.g., a set of feed fuel assemblies, etc.). Fissile nuclear fuel assemblies 22 may include U-235 (or any other appropriate fissile fuel) to start the fission reaction. Fertile nuclear fuel assemblies 24 may include U-238 or any other appropriate fertile nuclear fuel. According to one embodiment, a nuclear fission reactor 10 includes a handling system. The handling system may include an in-vessel handling system. The in-vessel handling system may be configured to provide at least one fissile nuclear fuel assembly 22 and at least one fertile nuclear fuel assembly 24, or a combination thereof. A control assembly associated with nuclear fission reactor 10 may include a plurality of reactivity control assemblies. The reactivity control assemblies may be configured to vary the reactivity of nuclear fission reactor core 12. In one embodiment, nuclear fission reactor 10 includes an assembly of one or more mechanisms, shown as neutron modifying material drive assembly 40 in FIGS. 1B-1C. Neutron modifying material drive assembly 40 is positioned to manipulate the plurality of reactivity control assemblies. As shown in FIGS. 1A-1C, nuclear fission reactor 10 also includes a reactor coolant system 30.

Still referring to FIGS. 1A-1C and FIG. 2, embodiments of the nuclear fission reactor 10 may be sized for any application as desired. For example, various embodiments of the nuclear fission reactor 10 may be used in low power (around 300 $MW_T$-around 500 $MW_T$) applications, medium power (around 500 $MW_T$-around 1000 $MW_T$) applications, and large power (around 1000 $MW_T$ and above) applications as desired.

Although embodiments of the nuclear fission reactor 10 are based on elements of liquid metal-cooled, fast reactor technology without the water-induced neutron impedance traditionally associated with light water reactors ("LWRs"), it is to be appreciated that the described control assemblies may be used in any nuclear reactor for any appropriate use of control of that reactor. In various embodiments, the reactor coolant system 30 includes a pool of liquid sodium disposed in the reactor vessel 14. In such cases, the nuclear fission reactor core 12 of FIG. 1 is submerged in the pool of sodium coolant in the reactor vessel 14. The reactor vessel 14 is surrounded by a containment vessel 32 that helps prevent loss of sodium coolant in the unlikely case of a leak from the reactor vessel 14.

In various embodiments, the reactor coolant system 30 includes a reactor coolant pump, shown as pump 34. As shown in FIGS. 1A-1B, reactor coolant system 30 includes two pumps 34. Pumps 34 may be any suitable pump as desired (e.g., an electromechanical pump, an electromagnetic pump, etc.).

Referring still to FIGS. 1A-1B, reactor coolant system 30 also includes heat exchangers 36. Heat exchangers 36 are disposed in the pool of liquid sodium. Heat exchangers 36 have non-radioactive intermediate sodium coolant on the other side of heat exchangers 36, according to one embodiment. To that end, heat exchangers 36 may be considered intermediate heat exchangers. According to one embodiment, steam generators are in thermal communication with the heat exchangers 36. It will be appreciated that any number of pumps 34, heat exchangers 36, and steam generators may be used as desired.

The pumps 34 circulate primary sodium coolant through the nuclear fission reactor core 12. The pumped primary sodium coolant exits the nuclear fission reactor core 12 at a top of the nuclear fission reactor core 12 and passes through one side of the heat exchangers 36. According to one embodiment, heated intermediate sodium coolant is circulated via intermediate sodium loops 38 to the steam generators. The steam generators may generate steam to drive turbines and electrical generators. According to other embodiments, heated intermediate sodium coolant is circulated to heat exchangers for still another use.

Referring again to FIGS. 1A-3, the illustrative nuclear fission reactor core 12 includes fissile nuclear fuel assemblies 22, fertile nuclear fuel assemblies 24, and a control assembly having a plurality of reactivity control assemblies. In one embodiment, the plurality of reactivity control assemblies includes a first reactivity control assembly 50 and a second reactivity control assembly 60. First reactivity control assembly 50 includes a first neutron modifying material 52 while second reactivity control assembly 60 includes a second neutron modifying material 62. The first and second neutron modifying materials may be the same or different and in some cases may be selected and tailored to improve control of the flux and/or shape of the wave in their differences. In one embodiment, the control system includes a number of first neutron modifying materials 52 sufficient to meet the various standards governing shutdown of nuclear fission reactor 10 during a SCRAM event. Second neutron modifying materials 62 may thereby play a relatively small role, if any, during the SCRAM event. By way of example, second neutron modifying materials may not be associated with the SCRAM system.

As shown in FIG. 2, in one embodiment, the control assembly includes eighteen first reactivity control assemblies 50 and eight second reactivity control assemblies 60. In one embodiment, FIG. 2 schematically represents a TWR design. In other embodiments, the control assembly includes at least one of a different number and/or placement of reactivity control assemblies 50 and a different number and/or placement of reactivity control assemblies 60. While FIG. 2 shows first reactivity control assemblies 50 and second reactivity control assemblies 60 oriented in a particular arrangement, at least one of reactivity control assemblies 50 and reactivity control assemblies 60 may be otherwise positioned within nuclear fission reactor core 12, according to various other embodiments.

Figure 3:
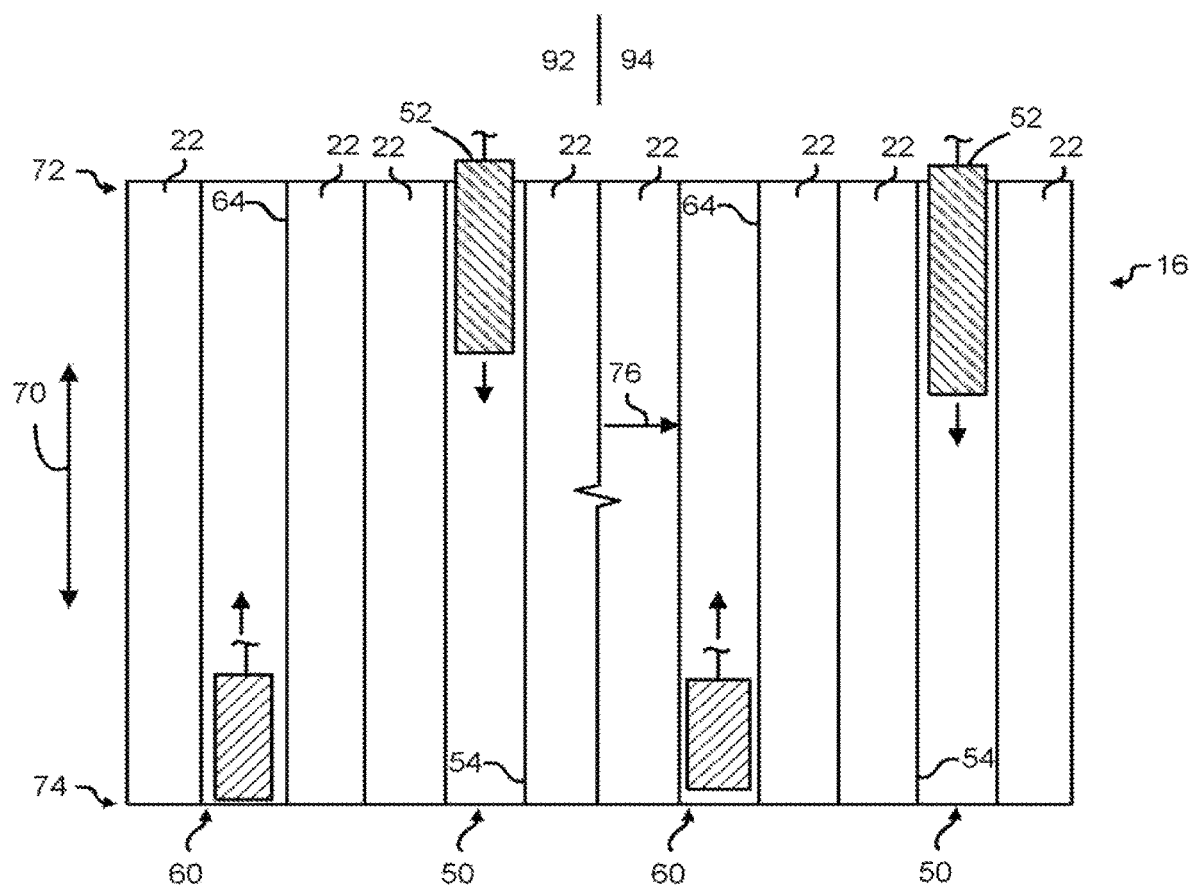
FIG. 3 is a side sectional view of a reactor core for a nuclear fission reactor, according to one embodiment.

As shown in FIGS. 1A-1B, fuel region 16 is generally cylindrical and extends along axial direction 70. In one embodiment, fuel region 16 includes a first end, shown as top end 72, and a substantially opposing second end, shown as bottom end 74. Although "top end" and "bottom end" are used to describe the fuel region 16, these phrases are in reference only to the orientation shown in the Figures. It is to be appreciated that any appropriate fuel core set up and/or orientation may be used and still be within the scope of substantially opposing ends 72 and 74. As shown in FIGS. 2-3, nuclear fission reactor core 12 and fuel region 16 define a radial direction 76 (e.g., along which a distance from the center of nuclear fission reactor core 12 or fuel region 16 outward to a position of interest may be measured, etc.) and an azimuthal direction 78 (e.g., along which a location around axial direction 70 or the periphery of nuclear fission reactor core 12 or fuel region 16 may be defined, etc.).

Figure 5:
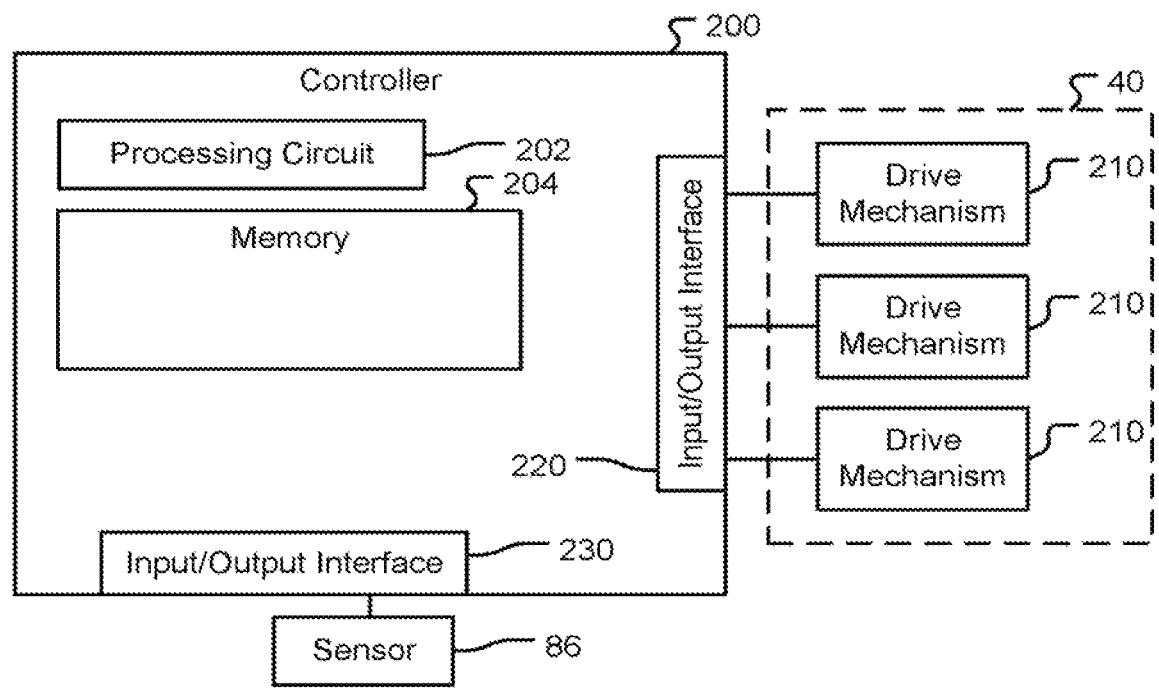
FIG. 5 is a schematic illustration of a control assembly for a nuclear fission reactor, according to one embodiment.

First neutron modifying material 52 and second neutron modifying material 62 may be selectively repositionable relative to fuel region 16 (e.g., along any one or more of (or combination of) axial direction 70, radial direction 76, azimuthal direction 78, etc.). In other embodiments, first neutron modifying material 52 and second neutron modifying material 62 are selectively repositionable relative to reactor vessel 14. As shown in FIG. 5, the control assembly includes neutron modifying material drive assembly 40. Neutron modifying material drive assembly 40 includes at least one drive mechanism coupled to first neutron modifying material 52 and second neutron modifying material 62, according to one embodiment. By way of example, the at least one drive mechanism may include a means for moving at least one assembly of the control assemblies, including without limitation an actuator (e.g., motor, etc.). The actuator may be coupled to first neutron modifying material 52 and second neutron modifying material 62 (e.g., with a first drive line and a second drive line and a first grapple and a second grapple, with a first drive line and a second grapple, etc.). By way of another example, the at least one drive mechanism may include a first actuator coupled to first neutron modifying material 52 (e.g., with a first drive line and a first grapple, etc.) and a second actuator coupled to second neutron modifying material 62 (e.g., with a second drive line and a second grapple, etc.).

In one embodiment, the means for moving at least one assembly of the control assemblies is positioned to translate first neutron modifying material 52 relative to fuel region 16 (e.g., into and out of fuel region 16 along axial direction 70, etc.). Additionally, or alternatively, the at least one actuator may be positioned to translate the second neutron modifying material 62 relative to fuel region 16. By way of example, the actuator may be positioned at top end 72 of fuel region 16 (e.g., above fuel region 16, etc.). In another embodiment, reactor vessel 14 includes a first end (e.g., a top end, etc.) and a substantially opposing second end (e.g., a bottom end, etc.). The first actuator and the second actuator may be positioned at the first end of reactor vessel 14. A drive line may extend downward between a first end coupled to the actuator and a second end coupled to the neutron modifying material. At least one of first neutron modifying materials 52 and second neutron modifying materials 62 may be positioned within receptacles. By way of example, the receptacles may include tubular bodies (e.g., hollow members, ducts, etc.). One or more repositioning means may be positioned to selectively reposition the receptacles and thereby selectively reposition first neutron modifying materials 52 and second neutron modifying materials 62.

The at least one drive mechanism is configured to provide (e.g., expose, translate, insert, introduce, withdraw, etc.) first neutron modifying material 52 and second neutron modifying material 62 in different directions into top end 72 of fuel region 16 and bottom end 74 of fuel region 16, respectively, according to the embodiment shown in FIG. 3. As indicated by arrows in FIG. 3, first neutron modifying materials 52 are provided downward and second neutron modifying materials 62 are provided upward. In one embodiment, the at least one drive mechanism is positioned or otherwise configured to provide first neutron modifying material 52 and second neutron modifying material 62 into substantially opposing ends of fuel region 16 along axial direction 70. A flux distribution within fuel region 16 may thereby be shifted upward toward top end 72 of fuel region 16 (e.g., relative to nuclear fission reactor cores that include traditional control assemblies, away from the second neutron modifying material, etc.).

As shown in FIG. 2, the illustrative nuclear fission reactor core 12 includes safety neutron modifying materials 82. Safety neutron modifying materials 82 are selectively repositionable relative to fuel region 16. By way of example, safety neutron modifying materials 82 may be selectively repositionable between an operating position (e.g., withdrawn from fuel region 16, spaced from fuel region 16, etc.) and a shutdown position (e.g., at least partially disposed along fuel region 16, etc.).

Nuclear fission reactor core 12 is shown in FIG. 2 to include control or shim rod 84 which may be stationary, passively controlled or actively controlled. The control or shim rods 84 may remain fixed during the power cycle. The control or shim rods 84 may include one or more sensors. In other embodiments, control or shim rods 84 are replaced by one or more first reactivity control assemblies 50. In still other embodiments, nuclear fission reactor core 12 does not include control or shim rods 84.

According to the embodiment shown in FIG. 2, nuclear fission reactor core 12 includes a sensor 86. Sensor 86 may be configured to provide sensing signals (e.g., data, etc.). In one embodiment, sensor 86 includes a flux monitor. Sensor 86 may be configured to provide sensing signals relating to the flux distribution within nuclear fission reactor core 12, whether or not the reactor core 12 incudes control or shim rods 84. By way of example, sensor 86 may include an axial flux monitor. The axial flux monitor may be configured to provide sensing signals relating to an axial profile of the flux distribution within nuclear fission reactor core 12.

Referring still to FIG. 2, the illustrative nuclear fission reactor core 12 includes six safety neutron modifying materials 82. As shown in FIG. 2, the illustrative nuclear fission reactor core 12 includes four PIRODs 84. Nuclear fission reactor core 12 may include one sensor 86. In other embodiments, nuclear fission reactor core 12 includes a different number of safety neutron modifying materials 82. Nuclear fission reactor core 12 may have a different number of PIRODs 84. In still other embodiments, nuclear fission reactor core 12 includes more or fewer sensors 86. At least one safety neutron modifying material 82 and PIROD 84 may be otherwise positioned within nuclear fission reactor core 12, according to various other embodiments. As shown in FIG. 2, sensor 86 is positioned within nuclear fission reactor core 12. Sensor 86 may be mounted, attached, or otherwise coupled to various components of nuclear fission reactor core 12. In other embodiments, sensor 86 is positioned remotely relative to nuclear fission reactor core 12. Sensor 86 positioned remotely relative to nuclear fission reactor core 12 may be coupled to one or more components of nuclear fission reactor core 12 or may be still otherwise supported.

According to the embodiment shown in FIGS. 2-3, first neutron modifying material 52 is spaced from second neutron modifying material 62. By way of example, first neutron modifying material 52 may be spaced from second neutron modifying material 62 along radial direction 76 of the fuel region 16. Additionally, or alternatively, first neutron modifying material 52 may be spaced from second neutron modifying material 62 along azimuthal direction 78 of the fuel region 16. In still other embodiments, first neutron modifying material 52 is angularly offset from second neutron modifying material 62. As shown in FIGS. 2-3, the control assembly includes a plurality of neutron modifying materials that are spaced relative to one another. In other embodiments, at least one of the first neutron modifying materials 52 is axially aligned in nuclear fission reactor core 12 (e.g., along axial direction 70, along radial direction 76, etc.) with at least one of the second neutron modifying materials 62.

In one embodiment, nuclear fission reactor core 12 and fuel region 16 have first lateral side 92 and substantially opposing second lateral side 94. First neutron modifying material 52 may be positioned on first lateral side 92 of fuel region 16. Second neutron modifying material 62 may be positioned on substantially opposing second lateral side 94 of fuel region 16. First neutron modifying material 52 and/or second neutron modifying material 62 may be disposed to enter opposing sides of fuel region 16 in nuclear fission reactor core 12. First neutron modifying material 52 and/or second neutron modifying material 62 may further enter fuel region 16 on an axial side (e.g., "top-down" and/or "bottom-up") and/or a radial side, as well as being disposed on either first lateral side 92 and/or second lateral side 94 of fuel region 16. First neutron modifying material 62 and second neutron modifying material 62 may enter fuel region 16 in a combination of the aforementioned configurations, including, but not limited to, first neutron modifying material 52 disposed above nuclear fission reactor core 12 in a "top-down" configuration and second neutron modifying material 62 disposed in a radial orientation and capable to translate into fuel region 16 from a radial side positioned relatively nearer to bottom end 74 of fuel region 16. It should be understood that any combination of orientations of first neutron modifying material 52 and second neutron modifying material 62 (axial, radial, lateral, etc.) at any relative distance between bottom end 74 and top end 72 of fuel region 15 is within the scope of the present disclosure.

First reactivity control assembly 50 may include a receptacle within which first neutron modifying material 52 is disposed. Second reactivity control assembly 60 may include a receptacle within which second neutron modifying material 62 is disposed. The receptacles may include tubular bodies similar to a fuel assembly. According to the embodiment shown in FIG. 3, first reactivity control assembly 50 includes a first receptacle 54 within which first neutron modifying material 52 is movably disposed. As shown in FIG. 3, second reactivity control assembly 60 includes a second receptacle 64 within which second neutron modifying material 62 is movably disposed. First receptacle 54 and second receptacle 64 extend through at least a portion of fuel region 16.

In other embodiments, first neutron modifying material 52 and second neutron modifying material 62 are positioned within a common receptacle associated with both first reactivity control assembly 50 and second reactivity control assembly 60. Neutron modifying material drive assembly 40 includes a mechanism (e.g., a screw mechanism, an actuator, a sealed fluid chamber, etc.) positioned within the common receptacle and between first neutron modifying material 52 and second neutron modifying material 62, according to one embodiment. Actuation or engagement of the mechanism may vary the relative positions of first neutron modifying material 52 and second neutron modifying material 62. By way of example, a screw coupled to first neutron modifying material 52 may be threaded into a nut coupled to second neutron modifying material 62 (e.g., with an actuator, etc.), thereby varying the relative positions of first neutron modifying material 52 and second neutron modifying material 62 (e.g., drawing the two neutron modifying materials together, etc.). The actuator of neutron modifying material drive assembly 40 may raise and lower first neutron modifying material 52 and second neutron modifying material 62 together.

In a high breeding rate reactor, fuel is preferentially bred in regions having relatively high flux levels. The wave is thus defined by regions where power is being generated (power distribution and/or power flux of the wave), which leads to regions where fertile fuel is bred up with excess neutrons. Breeding primarily occurs ahead of the wave. By way of example, the neutron modifying material may approach a first side of the wave. Breeding may occur primarily on a substantially opposing second side of the wave to breed up fertile fuel and create a new fuel location for a further power wave. The fuel location thereby also moves with the wave. Power is related to flux and material properties. As bred fuel comes to power, the power distribution within the nuclear fission reactor may also travel in the direction of wave movement.

According to the embodiments disclosed herein, wave movement (i.e., wave shifting, wave snuffing, etc. of the power wave, etc.) is controllable and occurs due to relative movement between the neutron modifying materials and the fuel of nuclear fission reactor 10. Because introduction of neutron modifying materials into the core absorbs or slows neutrons in the wave, those neutrons are less likely to either fission another atom or breed up a fertile atom to fissile fuel. In this control and reaction to neutrons with the neutron modifying material, the wave moves away from the neutron modifying material upon relative movement between the neutron modifying material and the fuel. Regions within the fuel relatively nearer to neutron modifying materials have reduced flux levels, which decreases the breeding rate within the adjacent fertile material. The wave is thereby pushed away from the neutron modifying material upon relative movement between the neutron modifying material and the fuel. Selective placement of the location of the first, second, and/or additional control assemblies axially and radially along fission reactor core 1002 permits wave movement, wave shifting, and wave shaping along axial and/or radial directions relative to the core. Modifications to the wave along axial and/or radial directions permits selection of the location and magnitude of neutron flux levels in the nuclear fission reactor 10, and, more particularly, axial and/or radial wave shaping permits selection of a total amount of flux over a period of time (also referred to herein as time-integrated flux) in a section of reactor core 1002. Placement of opposing control assemblies axially and/or radially along the fission reactor core permits an increased range of neutron flux shapes for given absolute control worth values because of the increased distribution of the control assemblies along the reactor core 1002. For example, a constant absolute control worth value may be achieved by inserting a "top-down" control assembly a fixed length into fuel region 1004, or, alternatively, by inserting a "top-down" control assembly one-half of the fixed length into fuel region 1004 and by inserting a "bottom-up" control assembly one-half of the fixed length into the fuel region 1004. Although both aforementioned configurations may have the same absolute control worth value, the shape of the neutron flux differs among the two configurations and the time-integrated flux in the fuel region can accordingly be more accurately controlled. In another implementation, the control assemblies may include fissile material including without limitation fissile material in combination with poisons or other fueled control material to maintain the time-integrated neutron flux of the system and therefore stop wave shifting.

Additional relative movement between the neutron modifying material and the fuel area again pushes the wave away from the neutron modifying material. The repositioning means disclosed herein employs one or more neutron modifying materials to selectively reposition the wave into one or more desired locations. The one or more desired locations may vary with time, power cycle, or based on still other factors.

During operation of a nuclear fission reactor, new feed assemblies may be introduced as part of a fuel redistribution process. The new feed assemblies are thereafter bred up and come to power along a wave (e.g., a standing wave, etc.) within the nuclear fission reactor core. The reactivity of the nuclear fission reactor is traditionally controlled by translating neutron modifying materials downward from above a fuel region toward a bottom end of the fuel region. Such translation of the neutron modifying material may push the wave downward.

The reactivity of the nuclear fission reactor is traditionally controlled by translating the neutron modifying material further into the fuel region. Wave movement may cause an axially-asymmetric flux distribution within the fuel region. The axially-asymmetric flux distribution preferentially breeds new fuel in the lower half of the feed assemblies. By way of example, the axially-asymmetric flux distribution may preferentially breed new fuel in the lower half of incoming feed assemblies. As the feed assemblies come to power, their plutonium distribution and reactivity peaks in the lower half of the fuel column.

The neutron modifying materials are traditionally provided further into the fuel region to control the output of the nuclear fission reactor core, thereby further pushing down the flux distribution for the next generation of feed assemblies. The plutonium distribution in successive generations of feed assemblies may thereby be skewed even lower. Such wave movement continues during the lifecycle of the nuclear reactor core. The flux distribution may come to equilibrium when the wave moves to the bottom of the nuclear fission reactor core. The equilibrium may be reached as increased neutron leakage (e.g., out through the bottom of the nuclear fission reactor core, etc.) stops further wave movement.

Figure 4:
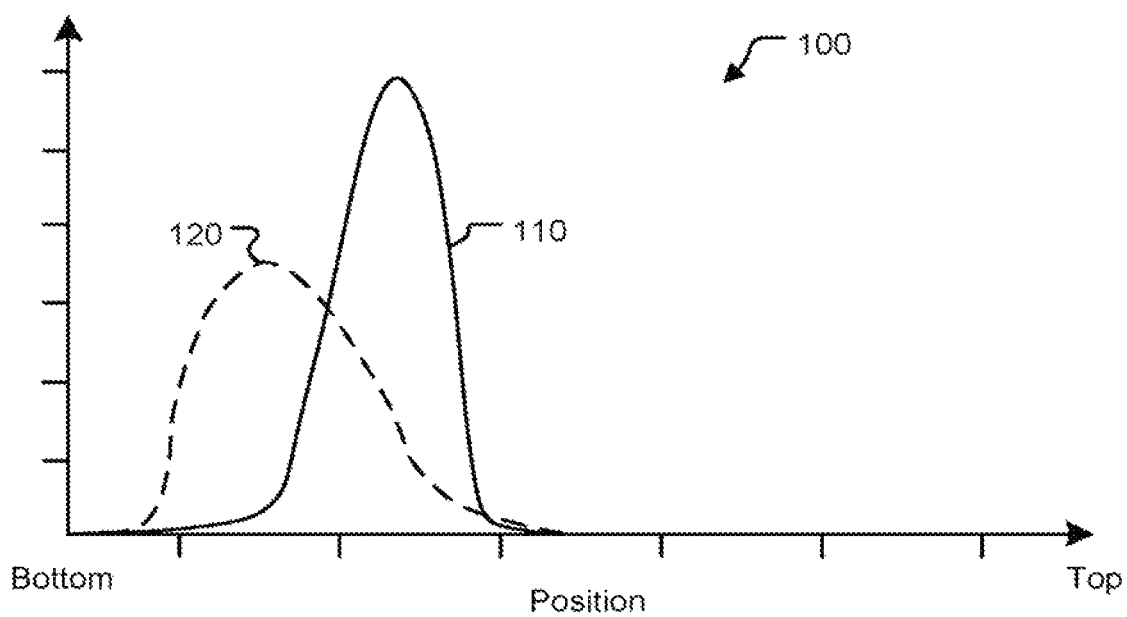
FIG. 4 is an illustrative power distribution plot for a nuclear fission reactor.

As shown in FIG. 4, the power distribution of a nuclear fission reactor core shifts due to wave movement. Illustrative power distribution plot 100 provides various profiles relating heat flux (e.g., in Watts per square meter, etc.) to position (e.g., elevation measured in meters, etc.). Illustrative power distribution plot 100 includes a first power distribution profile, shown as beginning of life profile 110, and a second power distribution profile, shown as end of life profile 120. The difference between end of life profile 120 relative to beginning of life profile 110 demonstrates that the power moves toward the bottom of the nuclear fission reactor core. The new equilibrium of the shifted wave causes power and burn-up peaking to occur below the fuel assemblies' mid-plane. Such power and burn-up peaking may cause a large increase in required burn-up and displacement per atom ("DPA") for a TWR as well as a significant increase to the DPA of the grid plate.

Applicant identified the problem of undesired wave movement while executing an innovative computational approach by running "controlled" numerical analysis cases. Numerical analyses of nuclear reactor cores have traditionally been run "uncontrolled," where all of the neutron modifying materials are modeled in a withdrawn position and the fission source in the neutronics calculations is scaled down by the effective neutron multiplication factor ("Kay"). The movement of the traveling wave does not manifest with this traditional computational approach. When executing the controlled numerical analysis cases, Applicant iterated upon the neutron modifying material activation depth and modeled the neutron modifying material position explicitly. When modeling the reactor in the uncontrolled and controlled cases, Applicant identified that the burn-up of the fuel assemblies increased from 29% to 33% and the DPA increased from 540 DPA to 640 DPA, respectively. Applicant believes that the control system disclosed herein may also change the reactivity swing over a cycle, thereby reducing the number of discharges during a power cycle and increasing the residence time of the fuel.

The worth of the neutron modifying materials is related to the neutron modifying materials' usefulness to damp or control reactivity within a nuclear fission reactor core. The worth of the neutron modifying material may vary with time and position within the nuclear fission reactor core. Wave movement may decrease the absolute value of the worth of the neutron modifying materials. A decrease in the absolute value of the worth means that the neutron modifying materials' ability to damp or control reactivity is decreased. Wave movement may decrease the absolute value of the worth of the neutron modifying materials because they have a decreased ability to damp or control reactivity, which is shifted further away from the bulk of the neutron modifying material.

The control assembly provides relative motion between the fuel of the nuclear reactor core and the one or more neutron modifying materials. Such relative motion is used to regulate the wave movement within nuclear fission reactor core 12. In one embodiment, the control assembly selectively repositions one or more neutron modifying materials relative to fuel that remains stationary during at least a portion of a power cycle. In another embodiment, the control assembly selectively repositions the fuel relative to one or more neutron modifying materials that remain stationary during at least a portion of a power cycle. In still another embodiment, the control assembly selectively repositions both the fuel and one or more neutron modifying materials during a power cycle. By way of example, the control assembly may simultaneously reposition both the fuel and one or more neutron modifying materials during a power cycle. By way of another example, the control assembly may sequentially reposition the fuel and one or more neutron modifying materials during a power cycle.

According to the illustrative embodiment shown in FIGS. 2-3 and 5, the control assembly includes a controller 200. A plurality of drive mechanisms 210 of neutron modifying material drive assembly 40 are coupled to first neutron modifying material 52. Additionally, or alternatively, the plurality of drive mechanisms 210 of neutron modifying material drive assembly 40 may be coupled to second neutron modifying material 62. Actuation of the plurality of drive mechanisms 210 varies the position of first neutron modifying material 52, according to one embodiment. Actuation of the plurality of drive mechanisms 210 may also vary the position of second neutron modifying material 62.

In one embodiment, controller 200 engages the plurality of drive mechanisms 210 to vary the position of first neutron modifying material 52 and second neutron modifying material 62 during the same power cycle. By way of example, controller 200 may engage the plurality of drive mechanisms to simultaneously vary the position of one or more assemblies of first neutron modifying materials 52. Additionally, or alternatively, controller 200 may engage the plurality of drive mechanisms to simultaneously (relative to each other or relative to first neutron modifying materials 52) vary the position of one or more assemblies of the second neutron modifying materials 62. By way of another example, controller 200 may engage the plurality of drive mechanisms to sequentially vary the position of first neutron modifying material 52 and/or second neutron modifying material 62 relative to each other or other first and/or second neutron modifying material assemblies. Such simultaneous or sequential movement may include each of the first neutron modifying materials 52 and each of the second neutron modifying materials 62. In other embodiments, the simultaneous or sequential movement involves moving a subset of the first neutron modifying materials 52. In still other embodiments, the simultaneous or sequential movement involves moving a subset of the second neutron modifying materials 62.

In another embodiment, controller 200 engages the plurality of drive mechanisms 210 to vary the position of first neutron modifying material 52 during a first power cycle. Controller 200 may engage the plurality of drive mechanisms 210 to thereafter remove first neutron modifying material 52 during or after the first power cycle. Controller 200 may engage the plurality of drive mechanisms 210 to subsequently vary the position of second neutron modifying material 62 during a second power cycle. In other embodiments, controller 200 is configured to fix the position of at least one first neutron modifying material 52 during a power cycle. In other embodiments, controller 200 is configured to fix the position of at least one second neutron modifying material 52 during a power cycle. Controller 200 may engage the plurality of drive mechanisms 210 to vary the position of at least one of a first neutron modifying material 52 and a second neutron modifying material 62 during the power cycle.

In one embodiment, both first neutron modifying materials 52 and second neutron modifying materials 62 are initially positioned at or above top end 72 of fuel region 16 at the beginning of a power cycle. By way of example, nuclear fission reactor core 12 may have a target $K_{eff}$ of 1.001 within this "fully withdrawn" state. The target $K_{eff}$ may provide a margin to facilitate startup while reducing the absolute value of the worth that could be introduced in the unlikely event of an accidental de-latching.

Controller 200 may engage at least one of the plurality of drive mechanisms 210 to lower second neutron modifying materials 62 to an intermediate position at or below bottom end 74 of fuel region 16 at a beginning phase of the power cycle. Second neutron modifying materials 62 may be removed from nuclear fission reactor core 12 or selectively repositioned by the repositioning means to the intermediate position in the event that there is not sufficient reactivity for startup. A traditional top-down-only control approach may be used until sufficient excess reactivity exists to selectively reposition second neutron modifying materials 62.

Controller 200 may engage at least one of the plurality of drive mechanisms 210 to selectively reposition first neutron modifying materials 52. In one embodiment, controller 200 thereby selectively repositions first neutron modifying materials 52 to control the reactivity within nuclear fission reactor core 12. By way of example, controller 200 may selectively reposition first neutron modifying materials 52 to control the reactivity according to traditional methods and standards during a power cycle. Controller 200 may engage at least one of the plurality of drive mechanisms 210 to selectively reposition second neutron modifying materials 62 to shift the wave. By way of example, controller 200 may engage at least one of the plurality of drive mechanisms 210 to selectively reposition second neutron modifying material 62 from the intermediate position. In one embodiment, controller 200 engages at least one of the plurality of drive mechanisms 210 to selectively reposition second neutron modifying material 62 to reduce undesired wave movement within nuclear fission reactor core 12 (e.g., according to unique methods and standards disclosed herein, etc.) during the power cycle. In one embodiment, movement of second neutron modifying materials 62 occurs over a relatively long period of time (e.g., movement on the scale of weeks, movement on the scale of months, etc.) rather than a relatively shorter time frame (e.g., hours, days, etc.). By way of example, movement of second neutron modifying materials 62 may be incremental and occur at a rate on the order of centimeters per week. By way of another example, movement of second neutron modifying materials 62 may be incremental and occur at a rate on the order of centimeters per month. Additionally, or alternatively, movement of second neutron modifying materials 62 may be incremental and slow relative to the rapid actuation of neutron modifying materials traditionally associated with safety control systems (e.g., at a rate on the order of meters per hour, at a rate on the order of meters per day, etc.).

Movement of first neutron modifying materials 52 and second neutron modifying materials 62 may be symmetric (e.g., a 10 cm downward movement of first neutron modifying materials 52 and a 10 cm upward movement of second neutron modifying materials 62, etc.) or asymmetric (e.g., a movement of second neutron modifying materials 62 that is not equalized with (and may be more or less than) a movement of first neutron modifying material 52, etc.). In one embodiment, controller 200 symmetrically moves first neutron modifying materials 52 and second neutron modifying materials 62 having equalized worths. In another embodiment, controller 200 asymmetrically moves first neutron modifying materials 52 and second neutron modifying materials 62 having different worths. By way of example, second neutron modifying materials 62 having a greater absolute value of worth may be moved less or to a shallower exposure depth and still provide a desired shift in or prevention of wave movement.

Controller 200 is configured to engage at least one drive mechanism 210 to vary a flux distribution within fuel region 16 of nuclear fission reactor core 12 (e.g., to correct for wave movement, etc.). As noted above with respect to FIG. 1, the control rod drive assembly 40 may include one or more drive mechanisms, of which the drive mechanism 210 is one example. Controller 200 may engage at least one of the plurality of drive mechanisms 210 to coordinate movement of first neutron modifying material 52 and second neutron modifying material 62. In one embodiment, controller 200 engages at least one of the plurality of drive mechanisms 210 such that first neutron modifying material 52 is lowered into fuel region 16 (e.g., from above fuel region 16, etc.) and second neutron modifying material 62 is raised into fuel region 16 (e.g., from below fuel region 16, etc.). In other embodiments, controller 200 engages at least one of the plurality of drive mechanisms 210 such that first neutron modifying material 52 and second neutron modifying material 62 are selectively repositioned relative to one another and travel in substantially opposite directions (e.g., move through fuel region 16 in substantially opposing directions during normal operation of nuclear fission reactor core 12, etc.). In still other embodiments, controller 200 engages at least one of the plurality of drive mechanisms 210 such that first neutron modifying material 52 and second neutron modifying material 62 are coordinated with one another and "pinch" fuel region 16 of nuclear fission reactor core 12.

In FIG. 5, the plurality of drive mechanisms 210 are coupled to controller 200 at an input/output interface 220. Sensor 86 is coupled to controller 200 at an input/output interface 230, according to the embodiment shown in FIG. 5. Controller 200 may be coupled to still other components to at least one of send command signals to control operation thereof and receive data signals therefrom.

In FIG. 5, the control assembly includes three drive mechanisms 210. In another embodiment, a single drive mechanism 210 is coupled to first neutron modifying materials 52 and second neutron modifying materials 62, actuation of the single drive mechanism 210 varying the positions of first neutron modifying materials 52 and second neutron modifying materials 62. In still other embodiments, the control assembly includes more or fewer drive mechanisms 210 as would be appropriate for moving the first neutron modifying material 52 and/or the second neutron modifying material 62 symmetrically and/or asymmetrically relative to each other or relative to other first and/or second neutron modifying materials 52 and/or 62.

Controller 200 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the embodiment shown in FIG. 5, controller 200 includes processing circuit 202 and memory 204. Processing circuit may include an ASIC, one or more FPGAs, a DSP, circuits containing one or more processing components, circuitry for supporting a microprocessor, a group of processing components, or other suitable electronic processing components.

In some embodiments, processing circuit 202 is configured to execute computer code stored in memory 204 to facilitate the activities described herein. Memory 204 may be any volatile or non-volatile computer-readable storage medium capable of storing data or computer code relating to the activities described herein. In one embodiment, memory 204 has computer code modules (e.g., executable code, object code, source code, script code, machine code, etc.) configured for execution by processing circuit 202. In some embodiments, controller 200 represents a collection of processing devices (e.g., servers, data centers, etc.). In such cases, processing circuit 202 represents the collective processors of the devices, and memory 204 represents the collective storage devices of the devices.

According to one embodiment, controller 200 is configured to actuate at least one of the plurality of drive mechanisms 210 based on a target flux distribution associated with fuel region 16. In one embodiment, the target flux distribution is centered at the axial midpoint of fuel region 16. The target flux distribution may include a desired flux distribution for fuel region 16. By way of example, the target flux distribution may have a desired flux distribution with at least one of axial, radial, and azimuthal variation. By way of another example, the target flux distribution may have a plurality of flux values associated with a plurality of axial positions along fuel region 16. The desired flux distribution over a defined time frame may have a desired shape (e.g., power lobes, an undulating profile, etc.). In other embodiments, the desired flux distribution over a defined time frame includes one or more desired angular flux gradients (e.g., to provide helical wave movement, etc.). According to another embodiment, controller 200 is configured to actuate at least one of the plurality of drive mechanisms 210 based on a target power production. A target power production may be associated with a target flux distribution according to a modeled or sensed amount of flux in fuel region 16.

In another embodiment, the target flux distribution includes a desired power distribution for fuel region 16. By way of example, the target flux distribution may include a desired flux distribution with at least one of axial, radial, and azimuthal variation. In still another embodiment, the target flux distribution includes a desired temperature distribution for fuel region 16. In yet another embodiment, the target flux distribution includes a maximum burn-up location positioned along a mid-plane of fuel region 16. In another embodiment, the target flux distribution includes a combination of flux values that facilitate achieving a target burn-up per cycle, per location (e.g., position, axially and radially, etc.) within nuclear fission reactor core 12.

The target flux distribution may remain fixed during a power cycle associated with nuclear fission reactor core 12. In other embodiments, the target flux distribution varies during the power cycle. By way of example, the target flux distribution may vary as a function of time. By way of another example, the target flux distribution may vary as a function of fuel performance characteristics. By way of still another example, the target flux distribution may vary as a function of one or more conditions within fuel region 16. The target flux distribution may be stored within memory 204 of controller 200.

Controller 200 may be configured to evaluate a deviation between the flux distribution (e.g., a current flux distribution within fuel region 16, etc.) and the target flux distribution. In one embodiment, sensor 86 is configured to perform power scanning and provide controller 200 with data relating to the flux distribution within fuel region 16. Sensor 86 may include a neutron flux sensor to directly measure neutron flux within fuel region 16. In another implementation, sensor 86 measures neutron flux within a fuel region indirectly, such as by measuring a temperature at or near fuel region 16. Direct or indirect neutron flux measurements may be sampled over a period of time to indicate an average or total neutron flux over the period. Controller 200 may generate a prediction of neutron flux in fuel region 16 over time that may be supplemented with measured data from sensor 86 and/or model data. A reactor model may output model data based on known quantities associated with fuel region 16 including without limitation initial fuel and control conditions, elapsed burn time, timing and quantity of refueling, prior control assembly configurations, and other factors on which neutron flux depends. A flux distribution of fuel region 16 may be determined by controller 200 based on the prediction. Controller 200 may be configured to actuate at least one of the plurality of drive mechanisms 210 (e.g., to vary the position of second neutron modifying material 62, to vary the position of first neutron modifying material 52, to vary the position of both first and second neutron modifying materials 52 and 62, etc.) in response to the deviation between the flux distribution and the target flux distribution exceeding a threshold range (e.g., a deviation of more than 0%, a deviation outside of a deadband range, a deviation beyond a threshold, etc.). In other embodiments, controller 200 is configured to actuate at least one of the plurality of drive mechanisms 210 (e.g., to vary the position of second neutron modifying material 62, etc.) as a function of the deviation.

Figure 6:
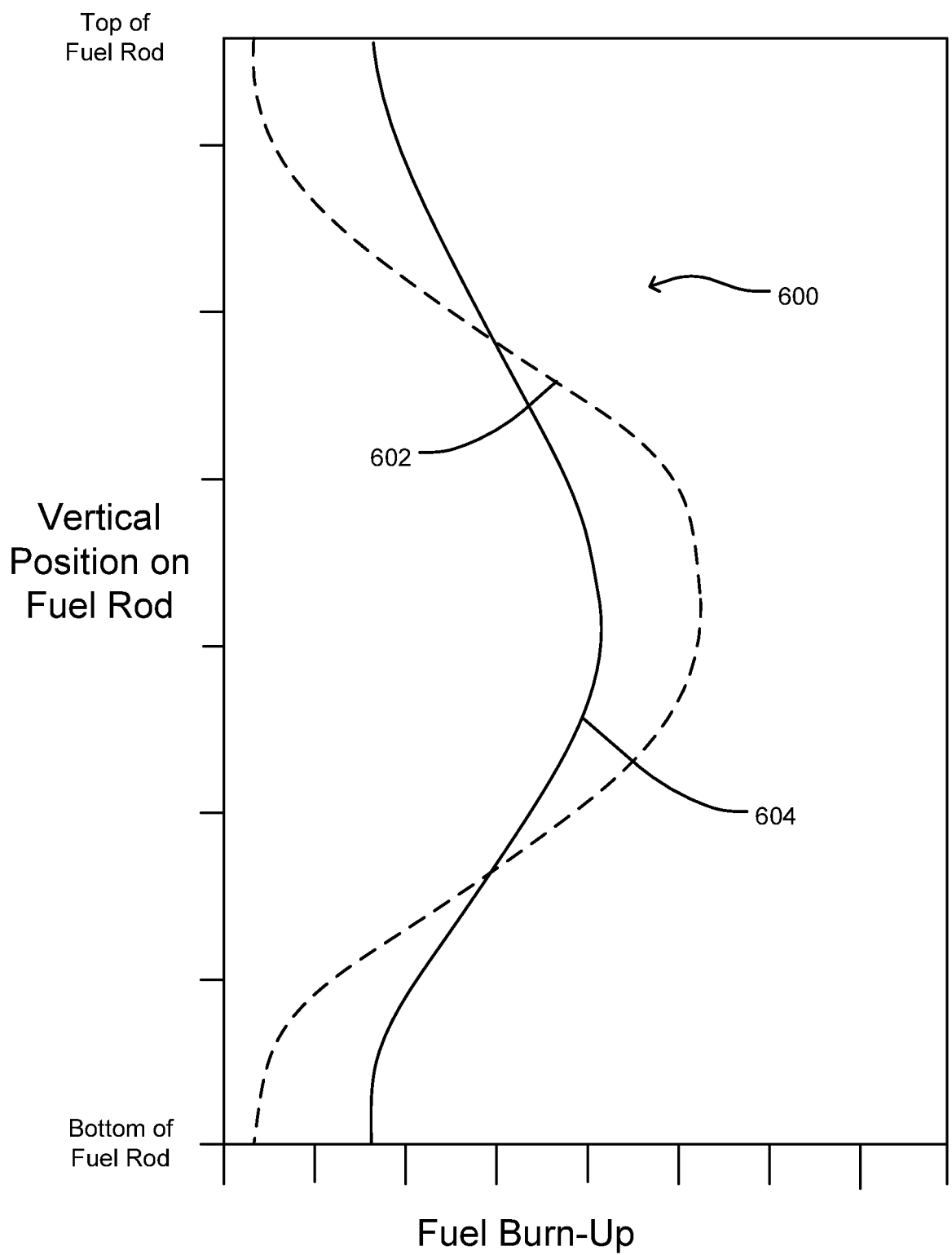
FIG. 6 is an illustrative burn-up distribution plot for a nuclear fission reactor, according to one embodiment.

FIG. 6 is a plot 600 illustrating "Burn-Up" of a fuel rod assembly inserted into a fuel region of a nuclear reactor core in accordance with implementations described herein. "Burn-Up" at a point on a fuel rod refers to the amount of neutron flux that point on the fuel rod has experienced during its duty cycle in the fuel region. Typically, portions of a fuel rod may be limited in terms of how much neutron flux the portion can endure before exceeding material strain parameters associated with the fuel rod. Once the material strain parameters for a portion of a fuel rod have been met or exceeded, it may be necessary to withdraw the rod from the fuel region to prevent mechanical failure of the fuel rod. If the neutron flux in a fuel region is more concentrated on one portion of a fuel rod disposed therein than on other regions of the rod, it is possible that the portion of the fuel rod exposed to the concentrated flux will "burn-up" more quickly than the other portions of the fuel rod. It may therefore be necessary to withdraw the rod due to the high burn-up before the remaining portions of the rod approach their burn-up limits, thus wasting fuel. According to implementations described herein, the first moveable control assemblies and second movable control assemblies may cooperate to shape neutron flux within a fuel region to equalize the time-integrated flux along the axial length of fuel rods. Equalizing neutron flux along the axial length of a fuel rod distributes burn-up effects more uniformly, and permits consumption of more available fuel in the rod before it is necessary to withdraw the rod due to risk of burn-up failure. This increases the lifetime of the fuel within the core, requires less downtime to move fuel into and out of the core, and reduces fuel waste. In one implementation, neutron flux may be temporarily shifted toward the proximal end of the fuel rod for a period of time, then shifted toward the distal end of the fuel rod for a corresponding period of time to allow the ends of the fuel rod to burn-up more, and to use more available fuel, without exceeding the burn-up limitations of the fuel rod.

Plot 600 plots fuel burn-up in, for example, percentage fission per initial metal atom, etc. to position (e.g., fuel block number, elevation measured in meters relative to a lower bound of the fuel region, etc.). Plot 600 illustrates a reference burn-up distribution 602 on fuel rods in a fuel region without first and second moveable control assemblies as disclosed herein. Plot 600 also plots a second burn-up distribution 604 illustrating a variation against reference burn-up distribution 602 indicating a more even distribution of burn-up, especially near the proximal and distal ends of the fuel rod, attributable to the first and second movable control assemblies disclosed herein. In some implementations, the total amount of burn-up according to the reference burn-up distribution 602 is equal to the total amount of burn-up 604 attributable to the first and second movable control assemblies disclosed herein, reflecting an unchanging amount of total neutron flux. In another implementation, the total amount of burn-up in distribution 604 is greater than under reference burn-up distribution 602 because distribution 604's more even distribution permits increased fuel efficiency by avoiding burn-up limitations of the fuel rod, thus burning a greater amount of fuel in the rod before it must be removed.

According to one embodiment, controller 200 is configured to engage at least one of the drive mechanisms 210 to selectively reposition one or more of the first neutron modifying materials 52. Additionally, or alternatively, controller 200 may be configured to engage at least one of the drive mechanisms 210 to selectively reposition one or more of the second neutron modifying materials 62, either symmetrically or asymmetrically relative to each other and/or relative to one or more of the first neutron modifying materials 52. By way of example, the first neutron modifying materials 52 may be moved as a first set downward into fuel region 16 to control reactivity. Additionally or alternatively, the second neutron modifying materials 62 may be moved as a second set upward into fuel region 16 to reduce the prevalence of undesired wave movement. According to another embodiment, controller 200 is configured to engage at least one of the drive mechanisms 210 to move a subset of first neutron modifying materials 52 separately from the remaining first neutron modifying materials 52. According to still another embodiment, controller 200 is configured to engage at least one of the drive mechanisms 210 to move a subset of second neutron modifying materials 62 separately from the remaining second neutron modifying materials 62. Controller 200 may thereby be configured to control the flux distribution within fuel region 16 based on a target flux distribution having at least one of axial, radial, and azimuthal variations. In one embodiment, controller 200 continuously controls the flux distribution within fuel region 16. By way of example, controller 200 may incrementally activate second neutron modifying material 62 uniformly or non-uniformly in time (e.g., continuously, iteratively at one or more predetermined time intervals, iteratively at time intervals that vary based on the flux distribution or another condition associated with fuel region 16, etc.). Additionally, or alternatively, controller 200 may incrementally activate second neutron modifying material 62 uniformly or non-uniformly in space (e.g., continuously, iteratively with one or more predetermined movements, iteratively with movements that vary based on the flux distribution or another condition associated with fuel region 16, etc.). Additionally, or alternatively, controller 200 may incrementally activate first neutron modifying material 52, either symmetrically or asymmetrically in time or space relative to the activation of second neutron modifying material 62.

The wave movement within fuel region 16 is thereby be regulated by the control assembly. In one embodiment, the control assembly regulates the wave movement to provide a target flux distribution. By way of example, the target flux distribution may include a desired flux distribution. The desired flux distribution may have a desired flux at one or more locations for various times.

In another embodiment, the control assembly regulates the wave movement such that the flux within the nuclear reactor core leads to a desired burn-up. The wave movement may be shifted in multiple directions (e.g., more than one direction, up and down, laterally side to side, etc.). By shifting the wave movement in multiple directions, the flux may be shifted over time. Shifting the flux over time may facilitate distribution of peak burn-up by the control assembly. In one embodiment, the control assembly shifts the flux over time to distribute the peak burn-up over a region of the fuel (e.g., over a volume of the fuel, along a length of the fuel, etc.). By way of example, controller 200 may be configured to sweep the flux over the fuel assemblies and guide burn-up by engaging at least one of the plurality of drive mechanisms 210 to selectively reposition first neutron modifying materials 52 and second neutron modifying materials 62.

In still another embodiment, the control assembly regulates wave movement to provide one or more desired temperatures within the nuclear fission reactor core. The desired temperatures may vary by position within the nuclear fission reactor core. The desired temperatures may vary with time and thereby change during one or more power cycles. In still other embodiments, the control assembly regulates wave movement to provide a combination of at least two of a desired flux distribution, a desired burn-up, and one or more desired temperatures within nuclear fission reactor core 12.

In still other embodiments, the target flux distribution relates to a flux distribution that shifts the wave along one or more directions. By way of example, the wave movement may be regulated to provide a shift thereof along axial direction 70 of nuclear fission reactor core 12. By way of another example, the wave movement may be regulated to provide a shift thereof along radial direction 76. By way of still another example, the wave movement may be regulated to provide a shift thereof along azimuthal direction 78. In still other embodiments, the power profile and the breeding profile within nuclear fission reactor core are selectively balanced axially and radially.

In one embodiment, controller 200 is configured to engage at least one of the plurality of drive mechanisms 210 to first selectively reposition those first neutron modifying materials 52 and/or second neutron modifying materials 62 that are located within a central region of the fuel region 16. Such engagement may thereby push the flux distribution or power profile outward into a substantially annular shape. In another embodiment, controller 200 is configured to engage at least one of the plurality of drive mechanisms 210 to first selectively reposition those first neutron modifying materials 52 and second neutron modifying materials 62 that are positioned toward a periphery of fuel region 16. Such engagement may thereby push the flux distribution or power profile inward and produce a lobed power distribution radially. In one embodiment, pushing the flux distribution and power profile inward increases burn-up.

In still other embodiments, controller 200 is configured to engage at least one of the plurality of drive mechanisms 210 to selectively reposition those first neutron modifying materials 52 and second neutron modifying materials 62 that are positioned medially (e.g., along a middle band of fuel region 16, between a central set of neutron modifying materials and a set of peripheral neutron modifying materials, etc.). Such engagement may thereby produce an outer tri-lobed power distribution having a major azimuthal lobe.

In one embodiment, the flux distribution is kept substantially annular over a power cycle. Such a substantially annular flux distribution may be maintained with the coordinated control of first neutron modifying material 52 and second neutron modifying material 62 by controller 200. By way of example, controller 200 may control first neutron modifying material 52 to travel from top end 72 of fuel region 16. Controller 200 may also control second neutron modifying material 62 to travel from bottom end 74 of fuel region 16.

The motions of first neutron modifying materials 52 and second neutron modifying materials 62 may be ⅓ core symmetric (e.g., a 30 centimeter downward movement of first neutron modifying materials 52 may be matched with a 10 centimeter upward movement of second neutron modifying materials 62, a 10 centimeter downward movement of first neutron modifying materials 52 may be matched with a 30 centimeter upward movement of second neutron modifying materials 62, etc.). Such motion may be particularly important given the relatively long neutron shadows cast by first neutron modifying materials 52 and second neutron modifying materials 62. In one embodiment, first neutron modifying materials 52 and second The control assembly may interweave (e.g., link movements of, coordinate movements of, alternate, etc. over time and/or location, etc.) first neutron modifying materials 52 and second neutron modifying material 62 to stabilize the power production of a single fuel assembly over the power cycle (e.g., such that the power production in a single fuel assembly remains nearly constant over the power cycle, etc.).

In some embodiments, a control assembly of nuclear fission reactor core 12 includes a third reactivity control assembly including a third neutron modifying material coupled to at least one of the plurality of drive mechanisms 210. Controller 200 may selectively engage at least one of the plurality of drive mechanisms 210 to move the third neutron modifying material in a direction of movement associated with first neutron modifying materials 52 (e.g., downward into fuel region 16 from an initial position at or above top end 72 of fuel region 16, etc.). The third neutron modifying material may be the same or different (e.g., in length, in width, in shape, in composition, etc.) than first neutron modifying materials 52 and/or second neutron modifying materials 62. Controller 200 may selectively engage at least one of the plurality of drive mechanisms 210 to move the third neutron modifying material based on the target flux distribution for fuel region 16. A control assembly having the third neutron modifying material may differentially control the flux distribution within fuel region 16. By way of example, controller 200 may selectively engage at least one of the plurality of drive mechanisms 210 to selectively reposition the third neutron modifying material into fuel region 16 along axial direction 70 rather than withdraw at least one of first neutron modifying materials 52. According to still another embodiment, fixed neutron modifying materials are positioned to shift the flux toward top end 72 of fuel region 16. The fixed neutron modifying materials may be disposed in control positions or as a burnable poison at bottom end 74 of fuel region 16, according to various embodiments.

In one embodiment, first neutron modifying materials 52 are all identical. In one embodiment, second neutron modifying materials 62 are all identical. First neutron modifying materials 52 may be identical to second neutron modifying materials 62. In other embodiments, at least one of the first neutron modifying materials 52 is different than at least one of the other first neutron modifying materials 52 and the second neutron modifying materials 62. By way of example, at least one of the first neutron modifying materials 52 may have a different length, width, shape, composition, and/or other feature than the other first neutron modifying materials or the second neutron modifying materials 62. The actuation direction and results achieved due to actuation may distinguish first neutron modifying materials 52 from second neutron modifying materials 62 even in embodiments where first neutron modifying materials 52 are similar to second neutron modifying materials 62.

In one embodiment, first neutron modifying material 52 and second neutron modifying material 62 both include solid materials. By way of example, the materials thereof may remain in a solid state during operation of nuclear fission reactor core 12. In one embodiment, at least one of the first neutron modifying materials 52 includes enriched boron. In another embodiment, at least one of the second neutron modifying materials 62 includes enriched boron.

According to another embodiment, at least one of first neutron modifying material 52 and second neutron modifying material 62 include a liquid. By way of example, the liquid may include a liquid poison. By way of another example, the liquid may include liquid water or another material that reduces the speed of neutrons.

In embodiments where at least one of first neutron modifying material 52 and second neutron modifying material 62 include a liquid, drive mechanisms 210 may include a pump configured to change the position thereof. In other embodiments, the liquid may be selectively repositioned using a capillary action. In still other embodiments, the liquid is in communication with a resilient member positioned to selectively reposition the liquid. By way of example, the liquid may be disposed within a passage. A gas spring or another resilient member may be in communication with the liquid. The pressure of the gas spring may be varied to selectively reposition the liquid. In one embodiment, the passage extends from top end 72, through fuel region 16, and into bottom end 74. In other embodiments, the passage extends at least one of radially through fuel region 16, circumferentially around at least a portion of a portion of fuel region 16, and axially along a length of fuel region 16. The passage may have various shapes to direct the liquid neutron modifying material through and into various portions of fuel region 16. Such a passage may facilitate desired control of the wave movement by controller 200.

Controller 200 may engage drive mechanism 210 and selectively vary the pressure of a fluid within the gas spring or otherwise actuate the resilient member. Such actuation may change the position of the liquid. Such a drive mechanism 210 may operate similar to a barometer. In other embodiments, the control assembly includes another physical arrangement of components for selectively repositioning a liquid neutron modifying material according to the profiles and strategies disclosed herein.

According to the embodiment shown in FIG. 3, first neutron modifying material 52 has a first length, and second neutron modifying material 62 has a second length. In one embodiment, the length of first neutron modifying material 52 is different than the length of second neutron modifying material 62. By way of example, the first length may be greater than the second length such that second neutron modifying material 62 is shorter than first neutron modifying material 52. Other measurements and properties of the first and second neutron modifying materials 52 and 62 may be the same, different or equalized as appropriate including width, composition, etc.

Figure 7:
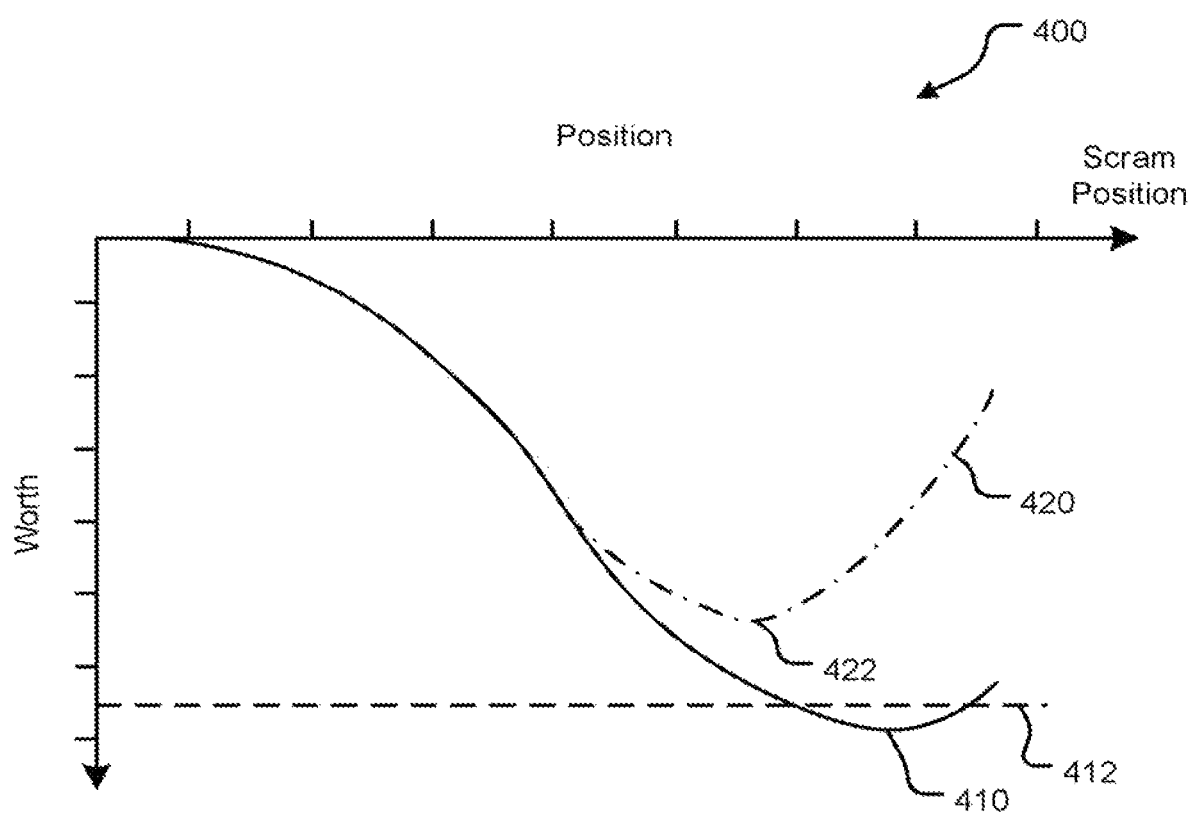
FIG. 7 is an illustrative worth plot for neutron modifying materials within a nuclear fission reactor, according to one embodiment.

As shown in FIG. 7, illustrative worth plot 400 provides various profiles relating worth of reactivity (e.g., in cents, etc.) to position (e.g., measured in meters, etc.). Illustrative worth plot 400 includes a first worth profile 410 and a second worth profile 420. In one embodiment, first worth profile 410 is illustrative of a worth profile associated with first neutron modifying material 52. Second worth profile 420 may be illustrative of a worth profile associated with second neutron modifying material 62. By way of example, first neutron modifying material 52 may have a length that is longer, and in some cases nearly one and a half to twice as long as that of second neutron modifying material 62. For example, first neutron modifying material 52 may have a length of 1.7 meters and second neutron modifying material 62 may have a length of 1.0 meters. First neutron modifying material 52 and second neutron modifying material 62 with such lengths (e.g., having compositions and other dimensional measurements in common, etc.) may have first worth profile 410 and second worth profile 420, respectively. A longer neutron modifying material may be more easily controlled to interface with or keep aligned to the wave associated with the breeding and burning within nuclear reactor core 12. A shorter neutron modifying material may move into, through, and away from the wave. In one embodiment, the length of the neutron modifying material is selected to provide a desired worth at one or more selected times.

As shown in FIG. 7, first neutron modifying materials 52 having a longer length have an absolute value of worth that increases as they are selectively repositioned into fuel region 16. First neutron modifying materials 52 have a worth that remains roughly constant at a value 412 once they reach the SCRAM position. A decrease in the absolute value of worth means that the neutron modifying material's ability to damp or control reactivity is decreased. Second neutron modifying materials 62 having a relatively shorter length have a worth whose absolute value increases upon initial activation. The absolute value of the worth of second neutron modifying materials then decreases after reaching a maximum worth value 422 (i.e., a maximum absolute value of worth, etc.). Second worth profile 420 has a significant "U shape" where the second neutron modifying materials 62 pass from the high worth region and then leave the core. Shorter second neutron modifying materials 62 may thereby have the same worth as the longer first neutron modifying materials 52. First neutron modifying materials 52 and second neutron modifying materials 62 having equalized worths may facilitate coordination of control by the controller 200. By way of example, first neutron modifying materials 52 and second neutron modifying materials 62 having equalized worths may facilitate substantially balancing control from the bottom and the top of nuclear fission reactor core 12. In one embodiment, second neutron modifying material 62 has a worth that is equalized with the worth of first neutron modifying material 52. Such equalization may facilitate control coordination by controller 200. By way of example, controller 200 may selectively coordinate control from substantially opposing ends of fuel region 16. First neutron modifying materials 52 and second neutron modifying materials 62 having an equalized worth may include neutron modifying materials that are structurally equalized (e.g., a common control material distribution, etc.), those that are equalized in worth through their positions within fuel region 16, or a combination thereof. In one embodiment, the maximum absolute value of the worth of each second neutron modifying material 62 is reasonably low (e.g., below about 20 cents, etc.). The reasonably low maximum absolute value of the worth of each second neutron modifying material 62 may accommodate unprotected overpower in the unlikely event of an accidental de-latching without boiling the working fluid (e.g., sodium, etc.).

FIGS. 8A-9G are a series of flowcharts depicting implementations. For ease of understanding, the flowcharts are organized such that the initial flowcharts present implementations via an example implementation and thereafter the following flowcharts present other implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIGS. 8A-8H provide illustrative flow diagrams for a method of controlling a nuclear reactor, shown as method 700, according to one embodiment. Although the method is presented as a sequence of steps for illustrative purposes, this sequence does not limit the scope of the claimed methods, and those of ordinary skill in the art will be aware of modifications and variations that may be made to the sequence.

Figure 8A:
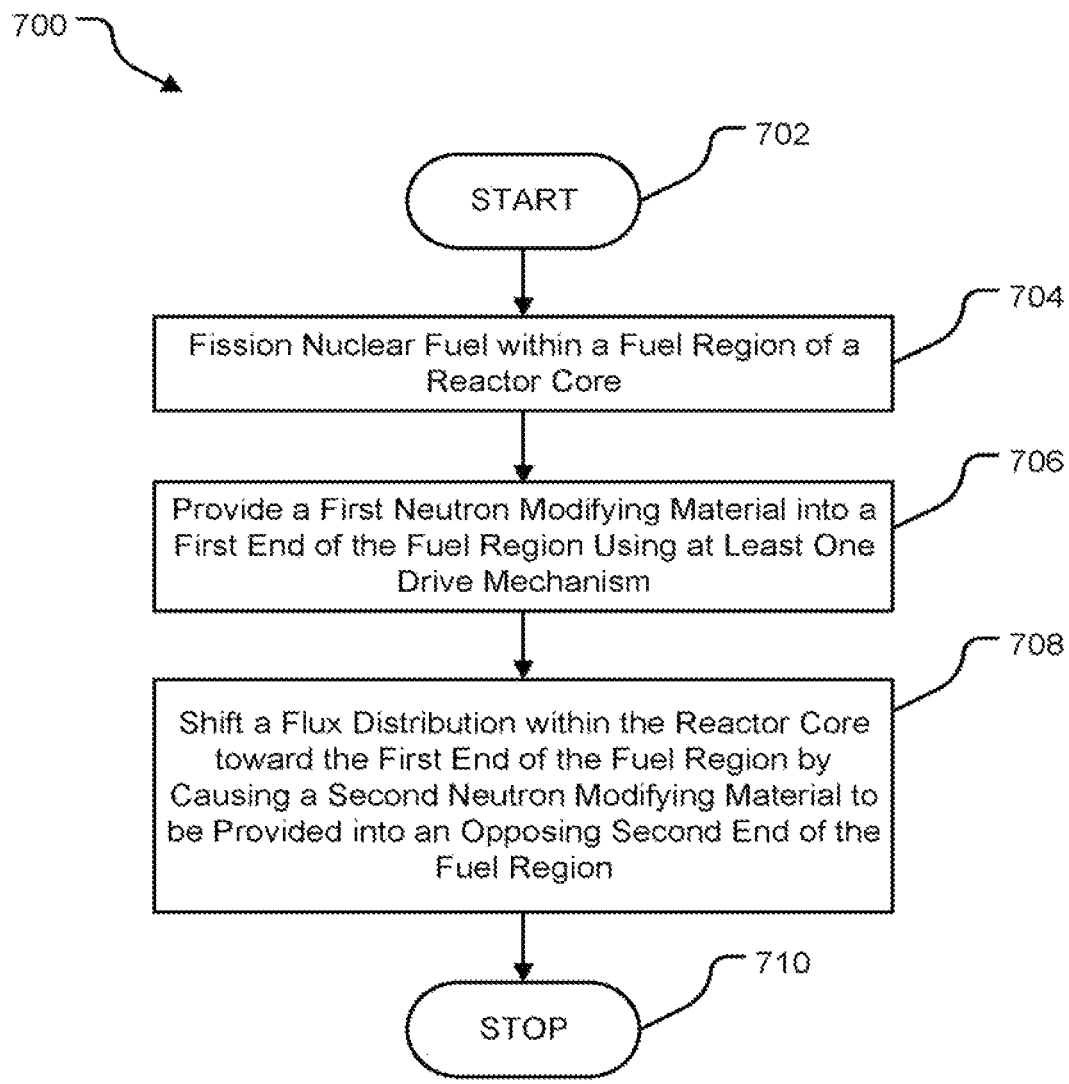
FIG. 8A is a schematic diagram of a method of controlling a nuclear reactor, according to one embodiment.

Referring to FIG. 8A, method 700 starts at block 702. At block 704, nuclear fuel is fissioned within a fuel region of a reactor core. At block 706, a first neutron modifying material is provided into a first end of the fuel region using at least one drive mechanism. At block 708, a flux distribution within the reactor core is shifted toward the first end of the fuel region by causing a second neutron modifying material to be provided into a substantially opposing second end of the fuel region. In one embodiment, method 700 stops at block 710. In other embodiments, method 700 continues. Additional method steps are set forth below by way of non-limiting example.

Figure 8B:
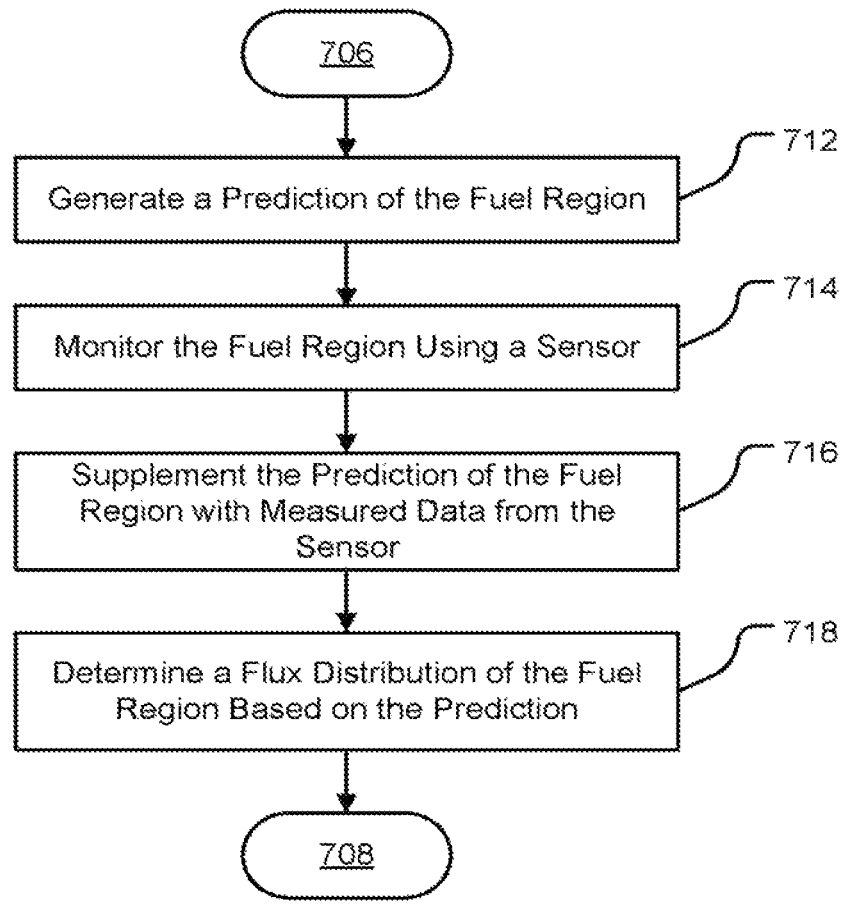
FIG. 8B is a schematic diagram of a method of controlling a nuclear reactor, according to one embodiment.
Figure 8C:
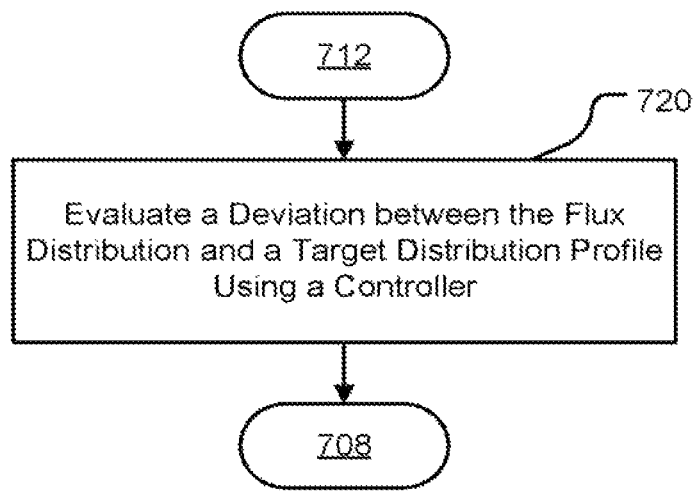
FIG. 8C is a schematic diagram of a method of controlling a nuclear reactor, according to one embodiment.
Figure 8D:
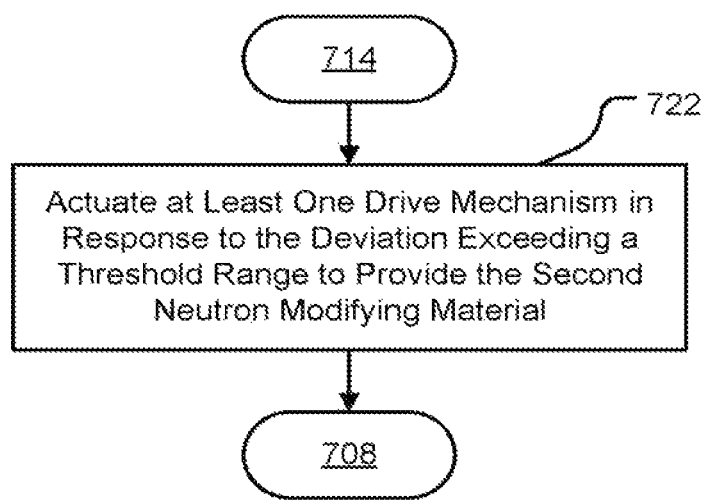
FIG. 8D is a schematic diagram of a method of controlling a nuclear reactor, according to one embodiment.
Figure 8E:
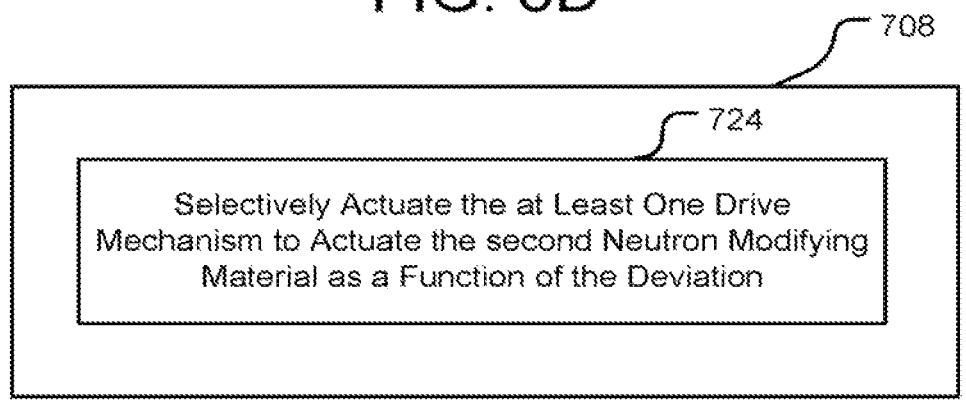
FIG. 8E is a schematic diagram of a method of controlling a nuclear reactor, according to one embodiment.
Figure 8F:
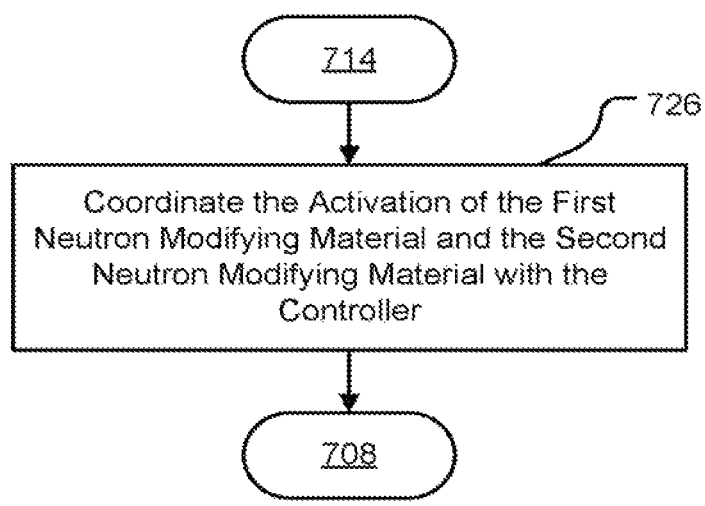
FIG. 8F is a schematic diagram of a method of controlling a nuclear reactor, according to one embodiment.
Figure 8G:
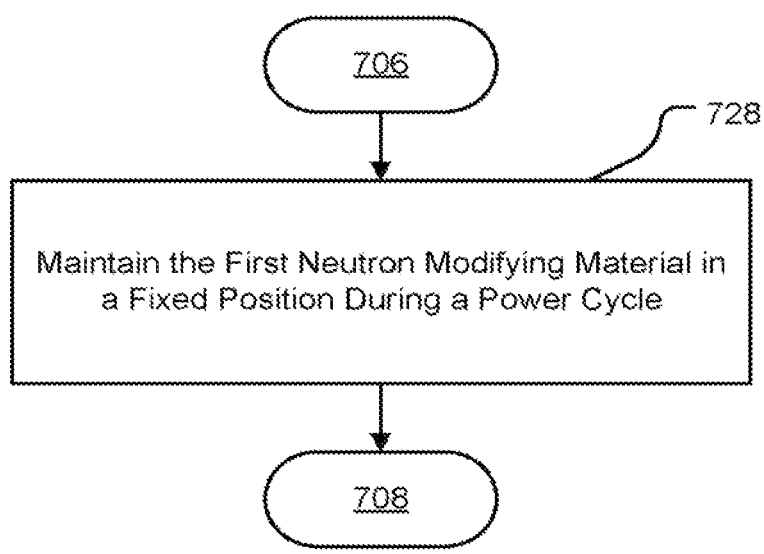
FIG. 8G is a schematic diagram of a method of controlling a nuclear reactor, according to one embodiment.
Figure 8H:
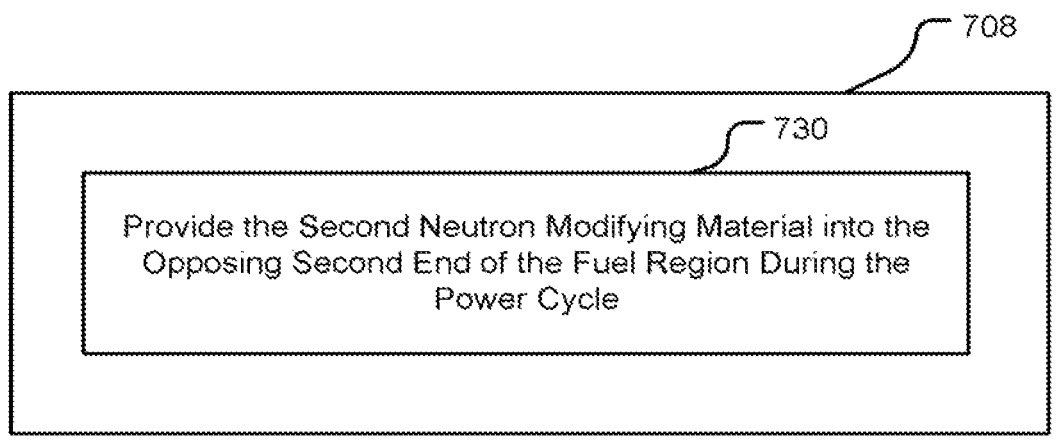
FIG. 8H is a schematic diagram of a method of controlling a nuclear reactor, according to one embodiment.

Referring to FIG. 8B, a prediction of the fuel region is generated, which may be performed using a controller, at block 712. The fuel region is monitored using a sensor at block 714. The prediction of the fuel region is supplemented with measured data from the sensor, which may be performed using the controller, at block 716. Additionally, or alternatively, the prediction of the fuel region may be supplemented with model data. A flux distribution of the fuel region is determined based on the prediction, which may be performed using the controller, at block 718. Referring to FIG. 8C, a deviation between the flux distribution and a target distribution profile is evaluated, which may be performed using a controller, at block 720. Referring to FIG. 8D, at least one drive mechanism is actuated in response to the deviation exceeding a threshold range to provide the second neutron modifying material at block 722. Referring to FIG. 8E, in some embodiments, shifting the flux distribution within the reactor core toward the first end of the fuel region at block 708 includes selectively actuating the at least one drive mechanism to actuate the second neutron modifying material as a function of the deviation at block 724. Referring to FIG. 8F, the activation of the first neutron modifying material and the second neutron modifying material is coordinated relative to one another with the controller at block 726. Referring to FIG. 8G, the first neutron modifying material is maintained in a fixed position during a power cycle at block 728. Referring to FIG. 8H, in some embodiments, shifting the flux distribution within the reactor core toward the first end of the fuel region at block 708 includes providing the second neutron modifying material into an opposing second end of the fuel region, which may include a substantially opposing second end of the fuel region, during the power cycle at block 730.

FIGS. 9A-9G provide illustrative flow diagrams for a method of manufacturing a control assembly for a nuclear reactor, shown as method 800, according to one embodiment. Although the method is presented as a sequence of steps for illustrative purposes, this sequence does not limit the scope of the claimed methods, and those of ordinary skill in the art will be aware of modifications and variations that may be made to the sequence.

Referring to FIG. 9A, method 800 starts at block 802. At block 804, a first reactivity control assembly having a first neutron modifying material is provided. At block 806, a second reactivity control assembly having a second neutron modifying material is provided. At block 808, at least one drive mechanism is coupled to the second neutron modifying material; in some cases, the at least one drive mechanism is coupled to the first neutron modifying material in addition to or alternative to the second neutron modifying material. In some embodiments, the at least one drive mechanism is configured to selectively reposition the second neutron modifying material into the fuel region such that a flux distribution within the fuel region is shifted away from the second neutron modifying material. In some embodiments, the at least one drive mechanism is configured to selectively reposition the first neutron modifying material in a different direction than the repositioning of the second neutron modifying material. In one embodiment, method 800 stops at block 810. In other embodiments, method 800 continues. Additional method steps are set forth below by way of non-limiting example.

Referring to FIG. 9B, in some embodiments, coupling at least one drive mechanism to the first neutron modifying material and the second neutron modifying material at block 808 may include coupling an actuator of the at least one drive mechanism to the first neutron modifying material and the second neutron modifying material at block 812. Referring to FIG. 9C, in some embodiments, coupling at least one drive mechanism to the first neutron modifying material and the second neutron modifying material at block 808 may include coupling a first actuator of the at least one drive mechanism to the first neutron modifying material and a second actuator of the at least one drive mechanism to the second neutron modifying material at block 814. Referring to FIG. 9D, the first neutron modifying material and the second neutron modifying material are positioned within a common receptacle at block 816. Referring to FIG. 9E, the first neutron modifying material and the second neutron modifying material are axially aligned in the nuclear reactor (e.g., along an axial direction thereof, along a radial direction thereof, etc.) at block 818. Referring to FIG. 9F, the first neutron modifying material is spaced from the second neutron modifying material along a radial direction of the nuclear reactor at block 820. Referring to FIG. 9G, additionally or alternatively, the first neutron modifying material may be spaced from the second neutron modifying material along an azimuthal direction of the nuclear reactor at block 822.

Figure 13:
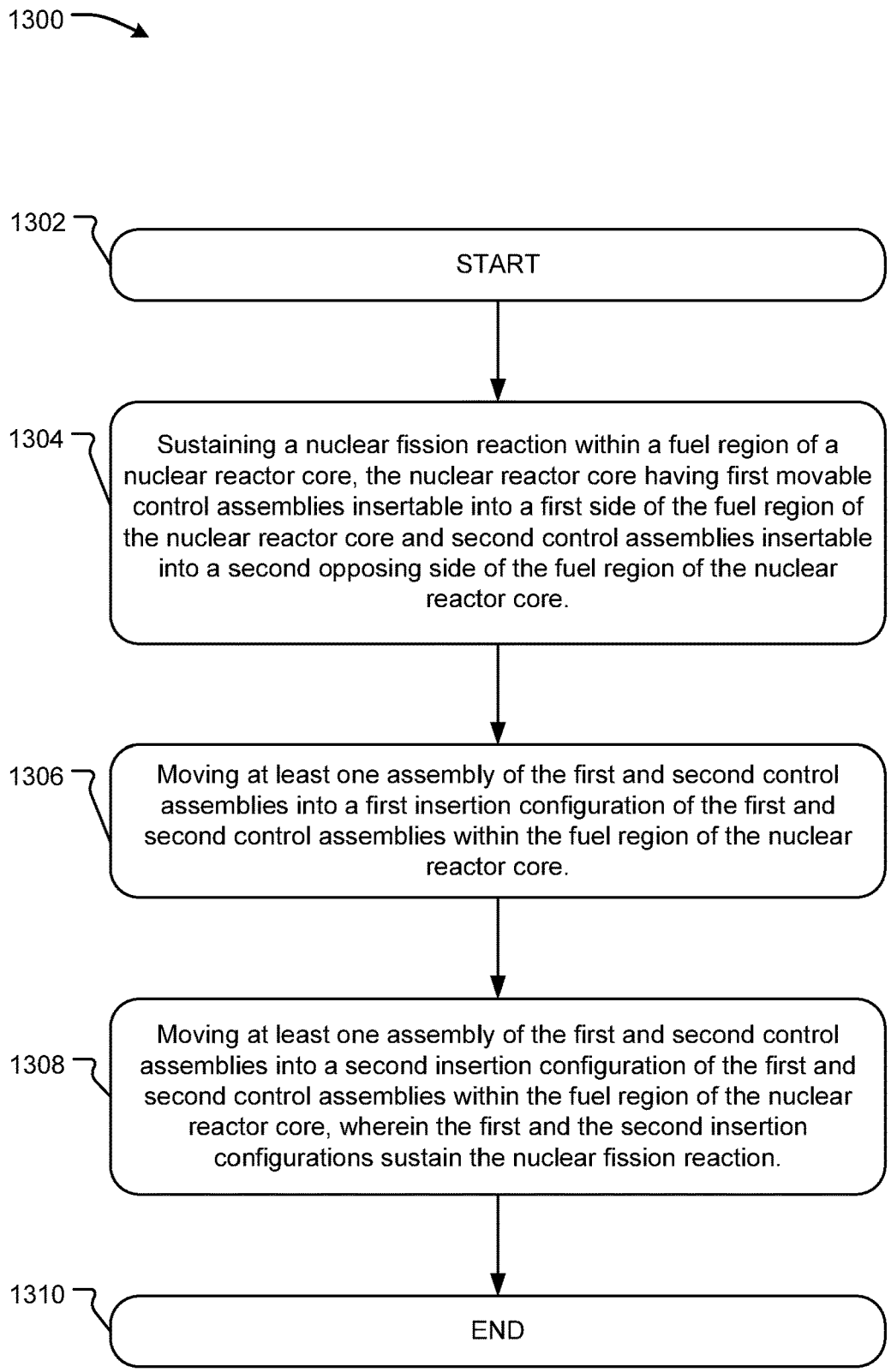
FIG. 13 is a flow diagram of a method of the implementations disclosed herein.

FIG. 13 is a flow diagram of a method of the implementations disclosed herein. The method of FIG. 13 begins at step 1302. Step 1304 is sustaining a nuclear fission reaction within a fuel region of a nuclear reactor core, the nuclear reactor core having first movable control assemblies insertable into a first side of the fuel region of the nuclear reactor core and second control assemblies insertable into a second opposing side of the fuel region of the nuclear reactor core. Step 1306 is moving at least one assembly of the first and second control assemblies into a first insertion configuration of the first and second control assemblies within the fuel region of the nuclear reactor core. Step 1308 is moving at least one assembly of the first and second control assemblies into a second insertion configuration of the first and second control assemblies within the fuel region of the nuclear reactor core, wherein the first and the second insertion configurations sustain the nuclear fission reaction. Method 1300 terminates at step 1310.

According to one embodiment, a control assembly for a nuclear reactor includes a first reactivity control assembly having a first neutron modifying material, a second reactivity control assembly having a second neutron modifying material, and at least one drive mechanism coupled to the first neutron modifying material, or the second neutron modifying material, or a combination thereof. The first neutron modifying material and the second neutron modifying material are selectively repositionable relative to a fuel region of the nuclear reactor. The at least one drive mechanism is configured to provide the first neutron modifying material and the second neutron modifying material in different directions through the fuel region thereby shifting a flux distribution within the fuel region away from the second neutron modifying material.

In one embodiment, the first neutron modifying material is axially aligned with the second neutron modifying material. In another embodiment, the first neutron modifying material is laterally spaced from the second neutron modifying material.

The first neutron modifying material may be positioned on a first lateral side of the fuel region. The second neutron modifying material may be positioned on a substantially opposing second lateral side of the fuel region.

The fuel region may extend along an axial direction, and the at least one drive mechanism may be configured to insert the first neutron modifying material and the second neutron modifying material into substantially opposing ends of the fuel region along the axial direction.

In one embodiment, the first neutron modifying material has a first length and the second neutron modifying material has a second length that is different than the first length. The first length may be greater than the second length, and the first neutron modifying material and the second neutron modifying material have a first worth profile and a second worth profile, respectively.

In one embodiment, the second neutron modifying material has a linear worth that is substantially equalized with the linear worth of the first neutron modifying material thereby coordinating control from substantially opposing ends of the fuel region. In one embodiment, the second neutron modifying material has a worth that is substantially equalized with the worth of the first neutron modifying material.

In another embodiment the at least one drive mechanism includes an actuator coupled to the first neutron modifying material and the second neutron modifying material. The actuator may be positioned to translate the first neutron modifying material and the second neutron modifying material relative to the fuel region.

The at least one drive mechanism may include a first actuator coupled to the first neutron modifying material and a second actuator coupled to the second neutron modifying material. The first actuator and the second actuator may both be positioned at the first end of the fuel region.

The first neutron modifying material may be movably disposed within a first tubular body, the second neutron modifying material may be movably disposed within a second tubular body, and the first tubular body and the second tubular body may extend through at least a portion of the fuel region.

In one embodiment, the first neutron modifying material and the second neutron modifying material are disposed within a common tubular body. The at least one drive mechanism may include an actuator coupled to the first neutron modifying material and the second neutron modifying material. The actuator may be positioned to translate the first neutron modifying material and the second neutron modifying material relative to the fuel region.

The at least one drive mechanism may include a mechanism positioned between the first neutron modifying material and the second neutron modifying material, and actuation of the mechanism may vary the relative positions of the first neutron modifying material and the second neutron modifying material.

In one embodiment, the control assembly includes a safety neutron modifying material that is selectively repositionable relative to the fuel region between an operating position and a shutdown position. The safety neutron modifying material may be at least partially disposed along the fuel region when oriented in the shutdown position. The safety neutron modifying material may be spaced from the fuel region when oriented in the operating position.

According to another embodiment, a nuclear reactor includes a reactor vessel, a plurality of fuel assemblies disposed at least partially within the reactor vessel and configured to contain nuclear fuel within a fuel region, a first reactivity control assembly having a first neutron modifying material, a second reactivity control assembly having a second neutron modifying material, at least one drive mechanism positioned to introduce the first neutron modifying material and the second neutron modifying material into substantially opposing ends of the fuel region, and a controller configured to actuate the at least one drive mechanism to vary a flux distribution within the fuel region during operation of the nuclear reactor. The first neutron modifying material and the second neutron modifying material are selectively repositionable within the reactor vessel.

In one embodiment, the nuclear reactor includes a sensor configured to provide data relating to the flux distribution within the fuel region. The sensor may include an axial flux monitor configured to provide sensing signals relating to an axial orientation of the flux distribution.

In one embodiment, the controller includes a processing circuit and a memory. The processing circuit may be configured to evaluate a deviation between the flux distribution and a target flux distribution, and the target flux distribution may be stored in the memory.

In one embodiment, the flux distribution and the target flux distribution include a plurality of flux values associated with a plurality of axial positions along the fuel region. The target flux distribution may include a maximum burn-up location positioned along the fuel region. The target flux distribution may also include operational fuel performance parameters including without limitation composition, strain limit, linear heat rate limits, etc. to improve fuel performance.

The controller may be configured to actuate the at least one drive mechanism in response to the deviation exceeding a threshold range. In another embodiment, the controller is configured to selectively actuate the at least one drive mechanism as a function of the deviation.

In one embodiment, the reactor vessel includes a first end and a substantially opposing second end. The first actuator and the second actuator may be both positioned at the first end of the reactor vessel.

In one embodiment, the first neutron modifying material is movably disposed within a first tubular body, the second neutron modifying material is movably disposed within a second tubular body, and the first tubular body and the second tubular body are coupled to the reactor vessel.

In one embodiment, the plurality of fuel assemblies includes a set of starter fuel assemblies and a set of feed fuel assemblies. The set of starter fuel assemblies may include fissile fuel material and the set of feed fuel assemblies may include fertile fuel material.

According to yet another embodiment, a method of controlling a nuclear reactor includes fissioning nuclear fuel within a fuel region of a reactor core, providing a first neutron modifying material into a first end of the fuel region using at least one drive mechanism, and shifting a flux distribution within the reactor core toward the first end of the fuel region by causing a second neutron modifying material to be provided into a substantially opposing second end of the fuel region.

In one embodiment, the method of controlling the nuclear reactor includes monitoring the flux distribution within the fuel region using a sensor.

In one embodiment, the method of controlling the nuclear reactor includes evaluating a deviation between the flux distribution and a target flux distribution and/or a deviation between the flux distribution and a target flux distribution over a defined time frame using a controller that includes a processing circuit and a memory. The target flux distribution may be stored within the memory.

In one embodiment, shifting the flux distribution within the reactor core includes actuating the at least one drive mechanism to insert the second neutron modifying material in response to the deviation exceeding a threshold range.

In one embodiment, shifting the flux distribution within the reactor core includes selectively actuating the at least one drive mechanism to insert the second neutron modifying material as a function of the deviation.

In one embodiment, shifting the flux distribution within the reactor core includes coordinating the insertion of the first neutron modifying material and the second neutron modifying material with the controller.

In one embodiment, the method of controlling the nuclear reactor includes maintaining the first neutron modifying material in a fixed position during a power cycle, and shifting the flux distribution includes inserting the second neutron modifying material into the substantially opposing second end of the fuel region during the power cycle.

According to another embodiment, a method of manufacturing a control assembly for a nuclear reactor includes providing a first reactivity control assembly having a first neutron modifying material, providing a second reactivity control assembly having a second neutron modifying material, and coupling at least one drive mechanism to the first neutron modifying material and the second neutron modifying material. The at least one drive mechanism is configured to provide the first neutron modifying material and the second neutron modifying material in different directions into the fuel region such that a flux distribution within the fuel region is shifted away from the second neutron modifying material. The first neutron modifying material and the second neutron modifying material are selectively repositionable relative to a fuel region of the nuclear reactor.

In one embodiment, the method of manufacturing a control assembly for a nuclear reactor includes coupling an actuator of the at least one drive mechanism to the first neutron modifying material and the second neutron modifying material and positioning the actuator to translate the first neutron modifying material and the second neutron modifying material relative to the fuel region.

In another embodiment, the method of manufacturing a control assembly for a nuclear reactor includes coupling a first actuator of the at least one drive mechanism to the first neutron modifying material and a second actuator of the at least one drive mechanism to the second neutron modifying material.

In one embodiment, the method of manufacturing a control assembly for a nuclear reactor includes positioning the first neutron modifying material and the second neutron modifying material within a common tubular body.

In one embodiment, the method of manufacturing a control assembly for a nuclear reactor includes axially aligning the first neutron modifying material with the second neutron modifying material.

In another embodiment, the method of manufacturing a control assembly for a nuclear reactor includes laterally spacing the first neutron modifying material from the second neutron modifying material.

In still another embodiment, the method of manufacturing a control assembly for a nuclear reactor includes positioning the first neutron modifying material on a first lateral side of the fuel region and positioning the second neutron modifying material on a substantially opposing second lateral side of the fuel region.

In one embodiment, the at least one drive mechanism is configured to coordinate the insertion of the first neutron modifying material and the second neutron modifying material.

An example method includes sustaining a nuclear fission reaction within a fuel region of a nuclear reactor core. The nuclear reactor core has first moveable control assemblies insertable into a first side of the fuel region of the nuclear reactor core and second control assemblies insertable into a second opposing side of the fuel region of the nuclear reactor core. The sustaining operation includes moving at least one assembly of the first and second control assemblies into a first insertion configuration of the first and second control assemblies within the fuel region of the nuclear reactor core and moving at least one assembly of the first and second control assemblies into a second insertion configuration of the first and second control assemblies within the fuel region of the nuclear reactor core. The first and the second insertion configurations sustain the nuclear fission reaction.

Another example method of any preceding method further includes the nuclear fission reaction yielding a first neutron flux distribution dependent on the first insertion configuration of the first and second control assemblies and yielding a second neutron flux distribution dependent on the second insertion configuration of the first and second control assemblies.

Another example method of any preceding method provides that the second nonzero neutron flux distribution is satisfied by a target total neutron flux over a predetermined period of time.

Another example method of any preceding method provides that the first flux distribution differs axially from the second nonzero flux distribution.

Another example method of any preceding method provides that the first flux distribution differs radially from the second nonzero flux distribution.

Another example method of any preceding method provides moving at least one assembly of third moveable control assemblies insertable into a third side of the nuclear reactor core section, the third moveable control assemblies being insertable into the nuclear reactor core section at a different angle than the first and second control assemblies.

Another example method of any preceding method provides moving at least one assembly of the first control assemblies and at least one assembly of the second control assemblies in at least a first direction such that the axial distance between the at least one moved assembly of the first control assemblies and the at least one moved assembly of the second control assemblies remains substantially constant during the moving operation.

Another example method of any preceding method provides moving at least one assembly of the first control assemblies and at least one assembly of the second control assemblies such that the distance between the at least one moved assembly of the first control assemblies and the at least one moved assembly of the second control assemblies is core symmetric.

Another example method of any preceding method provides moving at least one assembly of the first control assemblies and at least one assembly of the second control assemblies such that the axial distance between the at least one moved assembly of the first control assemblies and the at least one moved assembly of the second control assemblies changes during the moving operation.

Another example method of any preceding method provides that the nuclear fission reaction is a standing wave reaction.

Another example method of any preceding method provides that the first control assemblies and second control assemblies are disposed on substantially opposing sides of the standing wave reaction.

Another example method of any preceding method provides that at least one of the first or second control assemblies include a poison.

Another example method of any preceding method provides that the second neutron flux distribution is satisfied by a target total neutron flux over a predetermined period of time in a predetermined fuel region within the nuclear reactor core section.

An example system includes a nuclear reactor core including a fuel region. The example system also includes first control assemblies insertable into a first side of the fuel region, the first control assemblies moveable into a plurality of first insertion configurations. The example system also includes second control assemblies insertable into a second opposing side of the fuel region, the second control assemblies moveable into a plurality of second insertion configurations. The example system also includes at least one of the first insertion configurations and at least one of the second insertion configurations sustain a nuclear fission reaction.

Another example system of any preceding system includes one or more drive mechanisms operably coupled to the first control assemblies and second control assemblies and configured to move the first control assemblies into a first insertion configuration and second control assemblies into a second insertion configuration to sustain the nuclear fission reaction in the fuel region according to a target nonzero neutron flux distribution.

Another example system of any preceding system includes a drive mechanism including an actuator coupled to the first control assemblies and second control assemblies and configured to selectively reposition the first control assemblies and second control assemblies relative to the fuel region.

Another example system of any preceding system includes a target nonzero neutron flux distribution that is a total neutron flux over a predetermined period of time.

Another example system of any preceding system includes a target nonzero neutron flux distribution that is a total neutron flux over a predetermined period of time in a predetermined portion of the fuel region.

Another example system of any preceding system includes a target neutron flux distribution that corrects one or more axial asymmetries in a neutron flux distribution in the nuclear reactor core.

Another example system of any preceding system includes a target flux distribution that differs axially from a neutron flux in the nuclear reactor core.

Another example system of any preceding system includes a target flux distribution that differs radially from a neutron flux in the nuclear reactor core.

An example system includes nuclear fission reactor including means for sustaining a nuclear fission reaction within a fuel region of a nuclear reactor core, the nuclear reactor core having first moveable control assemblies insertable into a first side of the fuel region of the nuclear reactor core and second control assemblies insertable into a second opposing side of the fuel region of the nuclear reactor core. The example system also includes means for moving at least one assembly of the first and second control assemblies into a first insertion configuration of the first and second control assemblies with the fuel region of the nuclear reactor core and for moving at least one assembly of the first and second control assemblies into a second insertion configuration of the first and second control assemblies within the fuel region of the nuclear reactor core such that the first and the second insertion configurations sustain the nuclear fission reaction.

Another example system of any preceding system includes repositioning means for selectively repositioning the first control assemblies and second control assemblies relative to the fuel region.

Another example system of any preceding system includes means for detecting a current neutron flux distribution within the fuel region.

Another example system of any preceding system includes means for detecting a current neutron flux distribution including a neutron flux monitor.

Another example system of any preceding system includes means for detecting a current neutron flux distribution including a temperature sensor.

Another example system of any preceding system includes means for detecting a current neutron flux distribution including a neutron flux model.

Another example system of any preceding system includes means for moving at least one assembly of a third control assembly into a third insertion configuration of the first, second, and third control assemblies within the nuclear reactor core section to yield a third nonzero neutron flux distribution dependent on the third insertion configuration of the first, second, and third control assemblies.

Another example system of any preceding system includes means for moving at least one assembly of the first and second control assemblies into a second insertion configuration of the first and second control assemblies within the nuclear reactor core section to yield a second nonzero neutron flux distribution dependent on the second insertion configuration of the first and second control assemblies including a first actuator coupled to the at least one assembly of the first control assembly and a second actuator coupled to the at least one assembly of the second control assembly.

Another example system of any preceding system includes control means for controlling the means for moving at least one assembly of the first and second control assemblies into a second insertion configuration of the first and second control assemblies within the nuclear reactor core section to yield a second nonzero neutron flux distribution dependent on the second insertion configuration of the first and second control assemblies.

Another example system of any preceding system includes the second nonzero neutron flux distribution satisfies a target neutron flux distribution.

Another example system of any preceding system includes a target neutron flux distribution equals a total neutron flux over a predetermined period of time.

Another example system of any preceding system includes a target neutron flux distribution equals a total neutron flux over a predetermined period of time within a predetermined portion of the fuel region.

Another example system of any preceding system includes a target nonzero flux distribution correcting one or more axial asymmetries in a neutron flux distribution.

Another example system of any preceding system includes a standing wave reaction.

Another example system of any preceding system includes first and second control assemblies within the fuel region of the nuclear reactor core disposed on substantially opposing sides of the standing wave reaction.

Another example system of any preceding system includes first and second control assemblies within the fuel region of the nuclear reactor core including a poison.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
  sustaining a nuclear fission reaction within a fuel region of a nuclear reactor core, the nuclear reactor core having first moveable control assemblies insertable into a first side of the fuel region of the nuclear reactor core and second control assemblies insertable into a second opposing side of the fuel region of the nuclear reactor core, wherein the sustaining operation includes
    moving at least one assembly of the first and second control assemblies into a first insertion configuration of the first and second control assemblies within the fuel region of the nuclear reactor core; and
    moving at least one assembly of the first and second control assemblies into a second insertion configuration of the first and second control assemblies within the fuel region of the nuclear reactor core, wherein the first and the second insertion configurations sustain the nuclear fission reaction; and
    moving at least one assembly of the first control assemblies and at least one assembly of the second control assemblies in at least a first direction, wherein the distance between the at least one moved assembly of the first control assemblies and the at least one moved assembly of the second control assemblies remains substantially constant during the moving operation.

2. The method of claim 1, further comprising:
  wherein the nuclear fission reaction yields a first neutron flux distribution dependent on the first insertion configuration of the first and second control assemblies; and
  wherein the nuclear fission reaction yields a second neutron flux distribution dependent on the second insertion configuration of the first and second control assemblies.

3. The method of claim 2, wherein the second insertion configuration is selected such that the second neutron flux distribution provides a target total neutron flux over a predetermined period of time.

4. The method of claim 2, wherein the first flux distribution differs in an axial direction of the fuel region of the nuclear reactor core from the second flux distribution.

5. The method of claim 2, wherein the first flux distribution differs in a radial direction of the fuel region of the nuclear reactor core from the second flux distribution.

6. The method of claim 1, further comprising:
  moving at least one assembly of third moveable control assemblies insertable into a third side of the nuclear reactor core section, the third moveable control assemblies being insertable into the nuclear reactor core section at a different angle than the first and second control assemblies.

7. The method of claim 1, wherein the sustaining operation further comprises:
moving at least one assembly of the first control assemblies and at least one assembly of the second control assemblies, wherein the distance between the at least one moved assembly of the first control assemblies and the at least one moved assembly of the second control assemblies is core symmetric.

8. The method of claim 1, wherein the sustaining operation further comprises:
moving at least one assembly of the first control assemblies and at least one assembly of the second control assemblies, wherein the axial distance between the at least one moved assembly of the first control assemblies and the at least one moved assembly of the second control assemblies changes during the moving operation.

9. The method of claim 1, wherein the nuclear fission reaction is a standing wave reaction.

10. The method of claim 9, wherein the first control assemblies and second control assemblies are disposed on substantially opposing sides of the standing wave reaction.

11. The method of claim 1, wherein at least one of the first or second control assemblies include a poison.

12. The method of claim 1, wherein the second insertion configuration is selected such that the second neutron flux distribution provides a target total neutron flux over a predetermined period of time in a predetermined fuel region within the nuclear reactor core section.

13. A method of controlling a nuclear fission deflagration wave, comprising:
sustaining a nuclear fission reaction within a fuel region of a nuclear reactor core, the nuclear reactor core having first moveable control assemblies insertable into a first side of the fuel region of the nuclear reactor core and second control assemblies insertable into a second opposing side of the fuel region of the nuclear reactor core,
determining a target flux distribution profile;
shifting a flux distribution within the fuel region toward the target flux distribution profile by:
moving one or more of the first moveable control assemblies from a first insertion configuration to a second insertion configuration; and
moving one or more of the second moveable control assemblies from a third insertion configuration to a fourth insertion configuration.

14. The method of claim 13, wherein moving one or more of the first moveable control assemblies from a first insertion configuration to the second configuration comprises moving the one or more first moveable control assemblies in a direction that is at an angle relative to a longitudinal direction of the nuclear reactor core.

15. The method of claim 13, further comprising moving one or more third moveable control assemblies within the fuel region of the nuclear reactor core.

16. The method of claim 15, wherein moving the one or more third moveable control assemblies comprising moving the third moveable control assemblies in a direction that is at a different angle than a movement direction of the first moveable control assemblies and the second moveable control assemblies.

17. The method of claim 13, wherein the nuclear fission reaction is a standing wave reaction.

18. The method of claim 17, wherein the first moveable control assemblies and the second moveable control assemblies are disposed on substantially opposing sides of the standing wave reaction.

19. The method of claim 13, wherein the moving one of the first moveable control assemblies and the moving one of the second moveable control assemblies maintains a substantially constant distance between the moved first moveable control assemblies and the moved second control assemblies.

* * * * *